US008754185B2

(12) United States Patent
Breyer et al.

(10) Patent No.: US 8,754,185 B2
(45) Date of Patent: Jun. 17, 2014

(54) METHODS FOR MAKING AND USING AMINO-ALDEHYDE RESINS

(75) Inventors: Robert A. Breyer, Tucker, GA (US); Richard M. Rammon, Stockbridge, GA (US); Clinton L. Mills, Louisville, MS (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 204 days.

(21) Appl. No.: 13/292,223

(22) Filed: Nov. 9, 2011

(65) Prior Publication Data

US 2012/0115994 A1 May 10, 2012

Related U.S. Application Data

(60) Provisional application No. 61/412,057, filed on Nov. 10, 2010.

(51) Int. Cl.
*C08G 12/04* (2006.01)
*C08G 12/06* (2006.01)
*C08L 97/02* (2006.01)
*C08L 61/24* (2006.01)
*C08G 12/32* (2006.01)
*C08K 7/14* (2006.01)
*C08K 7/02* (2006.01)
*C08L 61/30* (2006.01)
*C08G 12/38* (2006.01)
*C08L 61/28* (2006.01)
*C08G 12/12* (2006.01)

(52) U.S. Cl.
CPC ............. *C08G 12/32* (2013.01); *C08L 61/24* (2013.01); *C08K 7/14* (2013.01); *C08K 7/02* (2013.01); *C08L 61/30* (2013.01); *C08G 12/38* (2013.01); *C08L 61/28* (2013.01); *C08G 12/12* (2013.01)
USPC ............. 528/266; 528/268; 528/269; 524/14

(58) Field of Classification Search
USPC .......................................... 528/266, 268, 269
See application file for complete search history.

(56) References Cited

U.S. PATENT DOCUMENTS

| | | | | |
|---|---|---|---|---|
| 3,792,020 A * | 2/1974 | Huck | ............................. | 523/307 |
| 3,896,087 A * | 7/1975 | Brunnmueller et al. | ...... | 524/598 |
| 4,039,496 A * | 8/1977 | Hermann | ............................. | 8/183 |
| 4,120,685 A * | 10/1978 | Vargiu et al. | ...................... | 71/30 |
| 4,247,433 A * | 1/1981 | Schamberg et al. | ........... | 524/843 |
| 4,381,368 A * | 4/1983 | Spurlock | ........................ | 524/598 |
| 4,482,699 A * | 11/1984 | Williams | ........................ | 528/260 |
| 4,501,851 A * | 2/1985 | Williams | ........................ | 524/542 |
| 4,536,245 A | 8/1985 | Shiau et al. | | |
| 4,564,667 A * | 1/1986 | Taylor | ........................ | 528/256 |
| 4,603,191 A * | 7/1986 | Kong | ............................. | 528/259 |
| 4,691,001 A * | 9/1987 | Taylor | ........................ | 528/256 |
| 4,814,422 A * | 3/1989 | Diem et al. | ................... | 528/230 |
| 4,906,727 A * | 3/1990 | Fischer et al. | ................. | 528/230 |
| 4,960,856 A * | 10/1990 | Formaini | ........................ | 528/256 |
| 4,962,182 A * | 10/1990 | Garrigue et al. | .............. | 528/230 |
| 4,968,773 A * | 11/1990 | Whiteside | ................... | 156/307.3 |
| 4,977,238 A * | 12/1990 | Garrigue et al. | .............. | 528/230 |
| 4,997,905 A | 3/1991 | Druet et al. | | |
| 5,010,164 A * | 4/1991 | Schollhorn | .................... | 528/243 |
| 5,034,500 A * | 7/1991 | Garrigue et al. | .............. | 528/259 |
| 5,120,821 A * | 6/1992 | Crews et al. | ................... | 528/230 |
| 5,162,462 A * | 11/1992 | Barthomieux et al. | ........ | 525/509 |
| 5,362,842 A | 11/1994 | Graves et al. | | |
| 5,389,716 A | 2/1995 | Graves | | |
| 5,599,884 A * | 2/1997 | Beleck | ............................. | 525/509 |
| 5,635,583 A * | 6/1997 | Motter et al. | ................... | 528/243 |
| 5,674,971 A | 10/1997 | Graves | | |
| 5,681,917 A | 10/1997 | Breyer et al. | | |
| 5,684,118 A | 11/1997 | Breyer et al. | | |
| 5,710,239 A | 1/1998 | Tutin | | |
| 6,034,201 A * | 3/2000 | Schollhorn | .................... | 528/243 |
| 6,306,194 B1* | 10/2001 | Wertz et al. | ........................ | 71/30 |
| 6,566,459 B1 | 5/2003 | Dopico et al. | | |
| 6,881,817 B2 | 4/2005 | Van Der Waals et al. | | |
| 2006/0151397 A1 | 7/2006 | Wright et al. | | |
| 2007/0055040 A1* | 3/2007 | Ratzsch et al. | ................ | 528/129 |
| 2008/0029460 A1* | 2/2008 | Wright et al. | .................. | 210/705 |
| 2008/0038971 A1* | 2/2008 | Tutin et al. | ........................ | 442/59 |
| 2009/0171062 A1* | 7/2009 | Hatjiissaak et al. | .......... | 528/259 |
| 2009/0326166 A1* | 12/2009 | No et al. | ........................ | 525/509 |
| 2009/0326185 A1* | 12/2009 | No et al. | ........................ | 528/256 |

OTHER PUBLICATIONS

No et al., Journal of Applied Polymer Science, vol. 93, 2559-2569, 2004.*
International Search Report and the Written Opinion of the International Searching Authority for PCT/US2011/059868 mailed May 16, 2012.

* cited by examiner

*Primary Examiner* — Liam J Heincer
(74) *Attorney, Agent, or Firm* — Ram W. Sabnis

(57) ABSTRACT

Methods for making and using amino-aldehyde resins. The method for making an amino-aldehyde resin can include mixing an intermediate amino-aldehyde reaction product having a total aldehyde compound to total amino compound molar ratio ranging from about 1.4:1 to about 3:1 with a first aldehyde compound and a first amino compound to produce an amino-aldehyde resin having a total aldehyde compound to total amino compound molar ratio ranging from about 0.5:1 to about 1.2:1. The concentration of the first aldehyde compound mixed with the intermediate reaction product can be about 1.9 wt % or more based on a combined solids weight of the aldehyde compounds and the amino compounds in the amino-aldehyde resin.

20 Claims, 1 Drawing Sheet

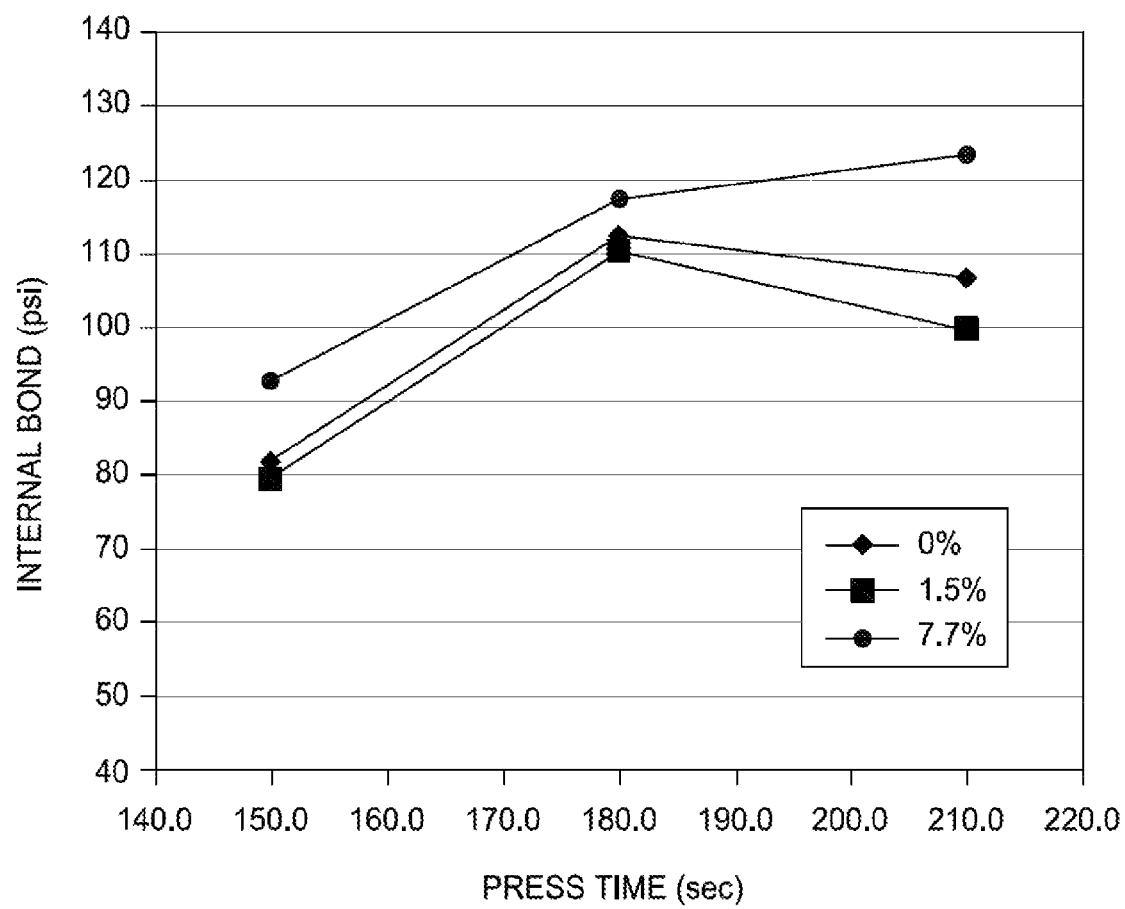

METHODS FOR MAKING AND USING AMINO-ALDEHYDE RESINS

CROSS-REFERENCE TO RELATED APPLICATIONS

This application claims priority to U.S. Provisional Patent Application having Ser. No. 61/412,057, filed Nov. 10, 2010, which is incorporated by reference herein.

BACKGROUND

1. Field

Embodiments described herein generally relate to amino-aldehyde resins. More particularly, such embodiments relate to methods for making and using amino-aldehyde resins.

2. Description of the Related Art

Typical adhesives used in the production of cellulose based products such as medium density fiberboard ("MDF"), plywood, and particle board include amino-formaldehyde resins such as urea-formaldehyde ("UF"), melamine-formaldehyde ("MF"), and melamine-urea-formaldehyde ("MUF") resins. While these resins produce cellulose based products having desirable properties, such as strength, these resins release formaldehyde into the environment during the production of the resin, during the curing of the resin/cellulose based product, as well as, from the final cellulose based product made using the resin.

Various techniques have been used to reduce the amount of formaldehyde released from amino-formaldehyde resins. Such techniques have used the addition of formaldehyde scavengers to the resin. Other techniques, alone or in combination with the scavengers, have used various modifications to the synthesis steps used to make the amino-formaldehyde resin, such as the addition of urea as a reactant late in the resin synthesis. These attempts to reduce formaldehyde emission, however, are accompanied with undesirable effects such as longer cure times, reduced shelf-life of the resin, reduced product strength, reduced tolerance for processing variations, and/or inferior moisture resistance.

There is a need, therefore, for improved methods for making amino-aldehyde resins and products therefrom having reduced formaldehyde emission and/or requiring reduced cure time.

SUMMARY

Methods for making and using amino-aldehyde resins are provided. The method for making an amino-aldehyde resin can include mixing an intermediate amino-aldehyde reaction product having a total aldehyde compound to total amino compound molar ratio ranging from about 1.4:1 to about 3:1 with a first aldehyde compound and a first amino compound to produce an amino-aldehyde resin having a total aldehyde compound to total amino compound molar ratio ranging from about 0.5:1 to about 1.2:1. The concentration of the first aldehyde compound mixed with the intermediate reaction product can be about 1.9 wt % or more based on a combined solids weight of the aldehyde compounds and the amino compounds in the amino-aldehyde resin.

A method for preparing a composite product and the resulting composite product are also provided. A plurality of particulates can be contacted with an amino-aldehyde resin, and the amino-aldehyde resin can be at least partially cured to produce the composite product. The amino-aldehyde resin can be produced by mixing an intermediate amino-aldehyde reaction product having a total aldehyde compound to total amino compound molar ratio ranging from about 1.4:1 to about 3:1 with a first amino compound and a first aldehyde compound. The amino-aldehyde resin can have a total aldehyde compound to total amino compound molar ratio ranging from about 0.5:1 to about 1.2:1. The concentration of the first aldehyde compound mixed with the intermediate reaction product can be about 1.9 wt % or more based on a combined solids weight of aldehyde compounds and amino compounds in the amino-aldehyde resin.

The composite product can include a plurality of particulates and an at least partially cured amino-aldehyde resin. The amino-aldehyde resin, prior to at least partial curing, can be produced by mixing an intermediate amino-aldehyde reaction product having a total aldehyde compound to total amino compound molar ratio ranging from about 1.4:1 to about 3:1 with a first amino compound and a first aldehyde compound. The amino-aldehyde resin can have a total aldehyde compound to total amino compound molar ratio ranging from about 0.5:1 to about 1.2:1. The concentration of the first aldehyde compound mixed with the intermediate reaction product can be about 1.9 wt % or more based on a combined solids weight of aldehyde compounds and amino compounds in the amino-aldehyde resin.

BRIEF DESCRIPTION OF THE DRAWINGS

The FIGURE depicts a graphical representation of the least squares means of the internal bond strength for the panels of CEx. 2A-C, CEx. 3A-C, and Ex. 3A-C at press times of 150 seconds, 180 seconds, and 210 seconds.

DETAILED DESCRIPTION

It has been surprisingly and unexpectedly discovered that combining an aldehyde compound ("first aldehyde compound") and an amino compound ("first amino compound") with an intermediate amino-aldehyde reaction product having an aldehyde compound to amino compound molar ratio ranging from about 1.4:1 to about 3:1 produces an amino-aldehyde resin having an aldehyde compound to amino compound molar ratio ranging from about 0.5:1 to about 1.2:1 that exhibits reduced aldehyde emission and/or reduced cure times. It has also been surprisingly and unexpectedly discovered that the first aldehyde compound can be pre-reacted with the first amino compound to produce a pre-reacted product containing one or more at least partially methylolated amino compounds. The pre-reacted product can then be combined with the intermediate amino-aldehyde reaction product having an aldehyde compound to amino compound molar ratio ranging from about 1.4:1 to about 3:1 to produce an amino-aldehyde resin having an aldehyde compound to amino compound molar ratio ranging from about 0.5:1 to about 1.2:1 that exhibits reduced aldehyde emission and/or reduced cure times.

As used herein, the terms "aldehyde compound(s) to amino compound(s) molar ratio," "molar ratio of the aldehyde compound(s) to amino compound(s)," "total aldehyde compound to total amino compound molar ratio," and "molar ratio of total aldehyde compound to total amino compound," are used interchangeably and refer to the total amount, in moles, of the aldehyde compound(s) combined with the amino compound(s) and assumes no loss of the aldehyde compound(s) or amino compound(s) through volatilization, hydrolysis, or other means. For example, 90.09 grams of a urea-formaldehyde resin produced by reacting 30.03 grams formaldehyde and 60.06 grams urea would be referred to as having a molar ratio of formaldehyde to urea of 1:1. Similarly, a 90.09 gram mixture of urea and formaldehyde having a molar ratio of formaldehyde to urea of 1:1 would also contain 30.03 grams formaldehyde and 60.06 grams urea.

As discussed and described in more detail below, the intermediate amino-aldehyde reaction product can be produced via a reaction process having two or more steps that can include at least partial methylolation of the amino compound followed by condensation or polymerization of the at least partially methylolated amino compound. The first aldehyde compound and the first amino-compound can be added to the intermediate amino-aldehyde reaction product after the condensation or polymerization has been substantially terminated or stopped. The first aldehyde compound and the first amino-compound can be added to the intermediate amino-aldehyde product while the condensation or polymerization is being terminated. The condensation or polymerization can be terminated or substantially terminated, for example, by increasing the pH of a reaction mixture undergoing condensation or polymerization a sufficient amount. The particular pH that can cause the condensation or polymerization of the reaction mixture to terminate or stop, thus producing the intermediate amino-aldehyde reaction product, can depend, at least in part, on the particular composition. For example, the condensation or polymerization of a reaction mixture containing urea and formaldehyde might be terminated or substantially terminated at a pH of somewhere between about 7 to about 8. In another example, the condensation or polymerization of a reaction mixture containing urea, melamine, and formaldehyde might be terminated or substantially terminated at a pH of somewhere between about 8 and about 9. The particular conditions, e.g., the temperature and/or pressure of the reaction mixture undergoing condensation/polymerization, the particular aldehyde compound(s), and/or the particular amino compound(s) in the reaction mixture, and/or the molar ratios between the particular aldehyde compound(s) and amino compound(s), can affect the particular pH and/or other conditions, e.g., temperature, that cause the condensation/polymerization reaction to terminate or substantially terminate.

While not wishing to be bound by theory, it is believed that the first aldehyde compound, when combined with the first amino compound and the intermediate amino aldehyde reaction product, at least partially methylolates or otherwise at least partially reacts with the first amino compound. It is believed that adding the first aldehyde compound and the first amino compound, the pre-reacted first aldehyde and first amino compound product, or a combination thereof, to the intermediate amino-aldehyde reaction product can produce an amino-aldehyde resin that is more easily or readily crosslinked when the amino-aldehyde resin is at least partially cured because there is an increased presence or amount of methylolated amino compounds in the amino-aldehyde resin as compared to an amino-aldehyde resin made by only adding the first amino compound thereto.

Accordingly, the addition of the first aldehyde compound and the first amino compound to the intermediate amino-aldehyde reaction product can be referred to as occurring under conditions that promote methylolation of the first amino compound by the first aldehyde compound as opposed to the condensation or polymerization of the first amino compound with the first aldehyde compound. In other words, the addition of the first amino compound to the intermediate amino-aldehyde reaction product can be referred to as occurring under conditions sufficient such that a reaction rate of methylolation is greater than a reaction rate of condensation or polymerization. The conditions that promote methylolation as opposed to condensation can include having the mixture of the first aldehyde compound, the first amino compound, and the intermediate amino-aldehyde reaction product at a pH of about 6.5 or more and/or a temperature of about 85° C. or less.

Additionally, it is believed that the free or unreacted amount of the first aldehyde compound added with the first amino compound to the intermediate amino-aldehyde reaction product can produce an amino-aldehyde resin that contains less than about 3 wt %, less than about 2 wt %, less than about 1.5 wt %, less than about 1 wt %, less than about 0.7 wt %, less than about 0.5 wt %, less than about 0.4 wt %, less than about 0.3 wt %, less than about 0.2 wt %, less than about 0.1 wt %, less than about 0.09 wt %, less than about 0.08 wt %, less than about 0.07 wt %, less than about 0.06 wt %, or less than about 0.05 wt % free or unreacted first aldehyde compound. As such, the amino-aldehyde resin as well as products made therefrom can exhibit reduced aldehyde emission while still maintaining a reduced cure time or acceptable rate of cure and/or products having sufficient strength. The amount of free formaldehyde can be measured according to ASTM D1979-97.

The first aldehyde compound, the first amino compound, and the intermediate amino-aldehyde reaction product can be combined with one another in any order or sequence to produce the amino-aldehyde resin. For example, the first amino compound can be combined with the intermediate amino-aldehyde reaction product to produce a mixture and the first aldehyde compound can be combined with the mixture to produce the amino-aldehyde resin. In another example, a first portion of the first amino compound can be combined with the intermediate amino-aldehyde reaction product to produce a first mixture, the first aldehyde compound can be combined with the first mixture to produce a second mixture, and a second or final portion of the first amino compound can be combined with the second mixture to produce the amino-aldehyde resin. In another example, the first aldehyde compound can be combined with the intermediate amino-aldehyde reaction product to produce a first mixture and the first amino compound can then be combined with the first mixture to produce the amino-aldehyde resin. In another example, the first aldehyde compound, the first amino compound, and the intermediate amino-aldehyde reaction product can be simultaneously or substantially simultaneously combined with one another to produce the amino-aldehyde resin.

The intermediate amino-aldehyde reaction product, the first amino compound and the first aldehyde compound can be combined with one another at a temperature of about 85° C. or less, about 80° C. or less, about 75° C. or less, about 70° C. or less, about 65° C. or less, about 60° C. or less, about 55° C. or less, about 50° C. or less, about 45° C. or less, about 40° C. or less, about 35° C. or less, or about 30° C. or less when the first aldehyde compound and the first amino compound are combined with the intermediate amino-aldehyde reaction product. For example, the intermediate amino-aldehyde reaction product can be at a temperature ranging from a low of about 5° C., about 10° C., about 15° C., or about 20° C. to a high of about 45° C., about 55° C., about 60° C., about 65° C., about 70° C., or about 75° C. when the first aldehyde compound and the first amino compound are combined therewith. In another example, the intermediate amino-aldehyde reaction product can be at a temperature of about 20° C. to about 85° C., about 20° C. to about 75° C., about 20° C. to about 65° C., or about 25° C. to about 60° C. when the first aldehyde compound and the first amino compound are combined therewith. The first aldehyde compound and the first amino compound can be at a temperature ranging from about 20° C. to about 85° C. when combined with the intermediate amino-aldehyde reaction product. The first aldehyde compound and the first amino compound can be at a temperature about equal to or less than the temperature the intermediate amino aldehyde-reaction product when combined therewith. For example, the first aldehyde compound and the first amino compound can be at a temperature of about 20° C. to about 30° C. and the intermediate amino-aldehyde reaction product can be at a temperature of about 55° C. to about 85° C. when combined. In another example, the first aldehyde compound and the first amino compound can be at a temperature of about 20° C. to about 30° C. and the intermediate amino-aldehyde reaction product can be at a temperature ranging from about 20° C. to about 85° C. when combined.

The mixture of first aldehyde compound, the first amino compound, and the intermediate amino-aldehyde reaction product can have a pH of about 6.5 or more, about 6.7 or more, about 7 or more, about 7.5 or more, about 8 or more, about 8.5 or more, about 9 or more, about 9.5 or more, or about 10 or more. For example, the mixture of the intermediate amino-aldehyde reaction product, the first aldehyde compound, and the first amino compound can have a pH ranging from a low of about 7, about 7.5, about 8, about 8.5, or about 9 to a high of about 9.5, about 10, about 10.5, about 11, about 11.5, or about 12. In another example, the mixture of the intermediate amino-aldehyde reaction product, the first aldehyde compound, and the first amino compound can have a pH of about 7.5 to about 11, about 7.5 to about 9, about 7.5 to about 8, about 8 to about 11, about 8 to about 9, about 8.5 to about 11, about 8.5 to about 10, about 9 to about 11, about 9 to about 10, about 9.5 to about 11, or about 9.5 to about 10.

The intermediate amino-aldehyde reaction product can have a total aldehyde compound to total amino compound molar ratio ranging from about 1.4:1 to about 3:1. For example, the intermediate amino-aldehyde reaction product can have a total aldehyde compound to total amino compound molar ratio ranging from a low of about 1.5:1, about 1.6:1, or about 1.7:1 to a high of about 2.5:1, about 2.6:1, about 2.7:1, about 2.8:1, or about 2.9:1. In another example, the intermediate amino-aldehyde reaction product can have a total aldehyde compound to total amino compound molar ratio ranging from about 1.6:1 to about 2.5:1, about 1.7:1 to about 2.5:1, about 1.8:1 to about 2.4:1, about 1.9:1 to about 2.4:1, about 1.9:1 to about 2.5:1, about 1.9:1 to about 2.8:1, or about 1.7:1 to about 2.7:1.

Depending on the particular molar ratio of the aldehyde compound(s) to the amino compound(s) in the intermediate amino-aldehyde reaction product, the amount of the first amino compound and the first aldehyde compound combined therewith can be sufficient to produce the amino-aldehyde resin having a total aldehyde compound to total amino compound molar ratio ranging from about 0.5:1 to about 1.2:1. For example, the amino-aldehyde resin can have total aldehyde compound to total amino compound molar ratio ranging from a low of about 0.5:1, about 0.6:1, about 0.7:1, or about 0.8:1 to a high of about 1:1, about 1.03:1, about 1.05:1, about 1.07:1, about 1.1:1, about 1.13:1, about 1.15:1, about 1.17:1, about 1.19:1, or about 1.2:1. In another example, the amino-aldehyde resin can have a total aldehyde compound to total amino compound molar ratio ranging from about 0.55:1 to about 1.2:1, about 0.65:1 to about 1.2:1, about 0.75:1 to about 1.2:1, about 0.85:1 to about 1.2:1, about 0.9:1 to about 1.2:1, or about 0.95:1 to about 1.2:1. In another example, the amino-aldehyde resin can have a total aldehyde compound to total amino compound molar ratio ranging from about 0.55:1 to about 1.15:1, about 0.65:1 to about 1.15:1, about 0.75:1 to about 1.15:1, about 0.85:1 to about 1.15:1, about 0.9:1 to about 1.15:1, or about 0.95:1 to about 1.15:1. In another example, the amino-aldehyde resin can have a total aldehyde compound to total amino compound molar ratio ranging from about 0.55:1 to about 1.1:1, about 0.65:1 to about 1.1:1, about 0.75:1 to about 1.1:1, about 0.85:1 to about 1.1:1, about 0.9:1 to about 1.1:1, or about 0.95:1 to about 1.1:1. In another example, the amino-aldehyde resin can have total aldehyde compound to total amino compound molar ratio ranging from 0.5:1 to about 1.05:1, about 0.6:1 to about 1.05:1, about 0.7:1 to about 1.05:1, about 0.8:1 to about 1.05:1, about 0.9:1 to about 1.05:1, or about 0.95:1 to about 1.05:1. In another example, the amino-aldehyde resin can have total aldehyde compound to total amino compound molar ratio ranging about 0.5:1 to about 1:1, about 0.6:1 to about 1:1, about 0.7:1 to about 1:1, about 0.8:1 to about 1:1, about 0.9:1 to about 1:1, or about 0.95:1 to about 1:1. In another example, the amino-aldehyde resin can have total aldehyde compound to total amino compound molar ratio ranging from about 0.5:1 to less than about 1:1, about 0.6:1 to less than about 1:1, about 0.7:1 to less than about 1:1, about 0.8:1 to less than about 1:1, about 0.9:1 to less than about 1:1, or about 0.95:1 to less than about 1:1. The total aldehyde compound to total amino compound molar ratio can range from about 0.5:1 to about 1.2:1 immediately after the first aldehyde compound and the first amino compound are mixed with the intermediate amino-aldehyde reaction product.

The concentration of the first aldehyde compound in the amino-aldehyde resin can be at least 1.9 wt %, at least 2 wt %, at least 2.1 wt %, at least 2.2 wt %, at least 2.3 wt %, at least 2.4 wt %, at least 2.5 wt %, at least 2.6 wt %, at least 2.7 wt %, at least 2.8 wt %, at least 2.9 wt %, at least 3 wt %, at least 3.1 wt %, at least 3.2 wt %, at least 3.3 wt %, at least 3.4 wt %, at least 3.5 wt %, at least 3.7 wt %, at least 4 wt %, at least 4.5 wt %, at least 5 wt %, at least 5.3 wt %, at least 5.5 wt %, at least 5.7 wt %, at least 6 wt %, at least 6.3 wt %, at least 6.5 wt %, at least 6.7 wt %, or at least 7 wt %, based on a combined solids weight of the aldehyde compounds and the amino-compounds in the amino-aldehyde resin. The concentration of the first aldehyde compound in the amino-aldehyde resin can range from a low of about 1.9 wt %, about 2.2 wt %, about 2.5 wt %, about 2.7 wt %, about 3 wt %, about 3.3 wt %, about 3.5 wt %, about 3.8 wt %, about 4.4 wt %, about 4.6 wt %, about 5 wt %, about 5.5 wt %, about 6 wt %, or about 6.5 wt % to a high of about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on a combined solids weight of the aldehyde compounds and the amino compounds in the amino-aldehyde resin. For example, the concentration of the first aldehyde compound in the amino-aldehyde resin can range from about 1.9 wt % to about 15 wt %, about 3 wt % to about 12 wt %, about 5 wt % to about 15 wt %, about 4 wt % to about 11 wt %, about 5 wt % to about 18 wt %, about 4.5 wt % to about 10 wt %, or about 6.5 wt % to about 15 wt %, based on the combined solids weight of the aldehyde compounds and the amino compounds in the amino-aldehyde resin. In another example, the concentration of the first aldehyde compound in the amino-aldehyde resin can range from about 3.5 wt % to about 15 wt %, about 4 wt % to about 12 wt %, about 2 wt % to about 10 wt %, about 6 wt % to about 9 wt %, about 5 wt % to about 9 wt %, about 7 wt % to about 8.5 wt %, or about 7 wt % to about 9 wt %, based on the combined solids weight of the aldehyde compounds and the amino compounds in the amino-aldehyde resin.

The concentration of the first aldehyde compound in the amino-aldehyde resin can be at least 10 wt %, at least 12 wt %, at least 14 wt %, at least 16 wt %, at least 18 wt %, at least 20 wt %, at least 22 wt %, at least 24 wt %, at least 26 wt %, at least 28 wt %, or at least 30 wt % based on the solids weight of the aldehyde compounds in the amino-aldehyde resin. The concentration of the first aldehyde compound in the amino-aldehyde resin can range from a low of about 10 wt %, about 13 wt %, about 15 wt %, about 19 wt % or about 21 wt % to a high of about 27 wt %, about 31 wt %, about 35 wt %, about 37 wt %, or about 40 wt % based on the solids weight of the aldehyde compounds in the amino-aldehyde resin. In another example, the concentration of the first aldehyde compound in the amino-aldehyde resin can range from about 11 wt % to about 38 wt %, or about 13 wt % to about 33 wt %, or about 15 wt % to about 27 wt %, or about 18 wt % to about 24 wt % based on the solids weight of the aldehyde compounds in the amino-aldehyde resin, on a solids basis.

While not wishing to be bound by theory, it is believed that the amino-aldehyde resin produced by mixing the intermediate amino-aldehyde reaction product with the first amino compound and the first aldehyde compound can exhibit a different carbon-13 nuclear magnetic resonance ("C-13 NMR") signal as compared to an amino-aldehyde resin produced by mixing the intermediate amino-aldehyde reaction product with the first amino compound. It is believed that the amino-aldehyde resin described herein will show an increase in the C-13 NMR signals, and will range from about 65.2 ppm to about 65.6 ppm, as compared to an amino-aldehyde resin produced by mixing the intermediate amino-aldehyde reaction product without the first aldehyde compound.

C-13 NMR signals in the range of about 65.2 ppm to about 65.6 ppm correspond to the chemical shift region associated with methylol carbons. It is believed that the increase in the C-13 NMR signals in the range of about 65.2 ppm to about 65.6 ppm can range from a low of about 0.1%, about 0.5%, about 1%, or about 2% to a high of about 5%, about 10%, about 50%, about 100%, about 125%, about 150%, about 175%, about 200%, about 300%, about 400%, about 500%, about 600%, about 700%, about 800%, about 900%, or about 1,000%, for the amino-aldehyde resin produced by mixing the intermediate amino-aldehyde reaction product with the first amino compound and the first aldehyde compound, as compared to an amino-aldehyde resin produced by mixing the intermediate amino-aldehyde reaction product with only the first amino compound. In another example, depending, at least in part, on the amount of the first aldehyde compound added to the intermediate amino-aldehyde reaction product, it is believed that the increase in the signals in the range of about 65.2 ppm to about 65.6 ppm, as determined by C-13 NMR, can be at least 0.1%, at least 1%, at least 10%, at least 50%, at least 75%, at least 100%, at least 200%, at least 300%, at least 400%, at least 500%, at least 600%, at least 700%, at least 800%, at least 900%, or at least 1,000%, for the amino-aldehyde resin produced by mixing the intermediate amino-aldehyde reaction product with the first amino compound and the first aldehyde compound, as compared to an amino-aldehyde resin produced by mixing the intermediate amino-aldehyde reaction product with only the first amino compound.

The amino-aldehyde resin produced by mixing the intermediate amino-aldehyde reaction product with the first amino compound and the first aldehyde compound can surprisingly and unexpectedly produce an amino-aldehyde resin having a lower onset temperature for the cure exotherm, as determined by Differential Scanning calorimetry ("DSC"), as compared to an amino-aldehyde resin produced by mixing the intermediate amino-aldehyde reaction product with only the first amino compound. For example, the onset temperature of the cure exotherm of the amino-aldehyde resin, as determined by DSC, can be reduced by about 1° C., about 2° C., about 3° C., about 4° C., about 5° C., about 6° C., about 7° C., about 8° C., about 9° C., or about 10° C., as compared to an amino-aldehyde resin produced by mixing the intermediate amino-aldehyde reaction product with only the first amino compound. In another example, the onset temperature of the cure exotherm of the amino-aldehyde resin, as determined by DSC, can be reduced by about 2° C., about 4° C., about 6° C., about 8° C., about 10° C., about 12° C., about 14° C., about 16° C., about 18° C., or about 20° C., or more, as compared to an amino-aldehyde resin produced by mixing the intermediate amino-aldehyde reaction product with only the first amino compound.

The DSC test can be conducted according to the following procedure. About 5-10 mg of amino-aldehyde sample can be added to a vented sample pan. The vented sample pan can be loaded along with an empty reference pan into a TA Instruments model 2920 DSC apparatus. The amino-aldehyde sample can then tested using a dynamic heating mode. The dynamic heating mode can include equilibrating the amino-aldehyde resin sample and empty reference at room temperature and then heating the amino-aldehyde resin sample and empty reference pan at a rate of about 5° C./minute in an air atmosphere. The temperature differential between the amino-aldehyde resin sample and the empty reference pan can be measured.

As used herein, the terms "curing," "cured," and similar terms are intended to embrace the structural and/or morphological change that occurs in the amino-aldehyde resin as it is cured to cause covalent chemical reaction (crosslinking), ionic interaction or clustering, improved adhesion to the substrate, phase transformation or inversion, and/or hydrogen bonding. As used herein, the term "partially cured" and similar terms are intended to refer to an amino-aldehyde resin that has undergone some covalent chemical reaction (crosslinking), ionic interaction or clustering, improved adhesion to the substrate, phase transformation or inversion, and/or hydrogen bonding, but is capable of undergoing additional covalent chemical reaction (crosslinking), ionic interaction or clustering, improved adhesion to the substrate, phase transformation or inversion, and/or hydrogen bonding.

The amino-aldehyde resin can be diluted by mixing with a liquid medium or can a solid, e.g., in powdered or dried form. Illustrative liquid mediums can include, but are not limited to, water, methanol, acetonitrile, or any combination thereof. An amino-aldehyde resin combined with a liquid medium can have a total concentration of solids ranging from about 1 wt % to about 99 wt %. For example, the amino-aldehyde resin combined with a liquid medium can have a concentration of solids ranging from a low of about 5 wt %, about 10 wt %, about 15 wt %, or about 20 wt % to a high of about 40 wt %, about 50 wt %, about 60 wt %, about 70 wt %, or about 80 wt %. As used herein, the solids content of an amino-aldehyde resin combined with a liquid medium, as understood by those skilled in the art, can be measured by determining the weight loss upon heating a small sample, e.g., 1-5 grams, of the amino-aldehyde resin to a suitable temperature, e.g., 105° C., and a time sufficient to remove the liquid. By measuring the weight of the sample before and after heating, the percent solids in the sample can be directly calculated or otherwise estimated.

The amino-aldehyde resin can have a viscosity ranging from about 30 cP to about 1,000 cP. For example, the amino-aldehyde resin can have a viscosity ranging from a low of about 30 cP, about 40 cP, about 50 cP, about 60 cP, about 70 cP, or about 80 cP to a high of about 500 cP, about 600 cP, about 700 cP, about 800 cP, about 900 cP, or about 1,000 cP. In another example, the amino-aldehyde resin can have a viscosity ranging from about 30 cP to about 300 cP, about 30 cP to about 400 cP, about 30 cP to about 500 cP, about 50 cP to about 300 cP, about 50 cP to about 400 cP, or about 50 cP to about 500 cP. In another example, the amino-aldehyde resin can have a viscosity ranging from about 100 to about 450, abut 150 to about 475, about 200 cP to about 400 cP, about 250 cP to about 350 cP, about 260 cP to about 335 cP, or about 270 cP to about 315 cP.

The intermediate amino-aldehyde reaction product, the amino-aldehyde resin, and the first amino-compound, can include one or more amino compounds. The one or more amino compounds can include, but are not limited to, urea, melamine, or a combination thereof. Urea can be provided in many forms. Solid urea, solutions of urea, and/or urea combined with another moiety can be used. For example, urea can be combined with another moiety, such as formaldehyde and/or urea-formaldehyde adducts, often in aqueous solution. In another example the urea can be or include a pre-reacted urea-formaldehyde mixture having a urea to formaldehyde weight ratio of about 1:2 to about 1:3. Illustrative urea-formaldehyde products can include, but are not limited to, Urea-Formaldehyde Concentrate ("UFC"). These types of products can be as discussed and described in U.S. Pat. Nos. 5,362,842 and 5,389,716, for example.

Melamine can also be provided in many forms. For example, solid melamine, such as prill and/or melamine solutions can be used. Although melamine is specifically referred to, the melamine can be totally or partially replaced with other aminotriazine compounds. Other suitable aminotriazine compounds can include, but are not limited to, substituted melamines, cycloaliphatic guanamines, or combinations thereof. Substituted melamines include the alkyl melamines and aryl melamines that can be mono-, di-, or tri-substituted. In the alkyl substituted melamines, each alkyl group can contain 1-6 carbon atoms and, preferably 1-4 carbon atoms. Illustrative examples of the alkyl-substituted melamines can include, but are not limited to, monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, one phenyl radical. Illustrative examples of aryl-substituted melamines can include, but are not limited to, monophenyl melamine and diphenyl melamine Any of the cycloaliphatic guanamines can also be used. Suitable cycloaliphatic guanamines can include those having 15 or less carbon atoms. Illustrative cycloaliphatic guanamines can include, but are not limited to, tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethylhexahydrobenzoguanamine and mixtures thereof. Mixtures of aminotriazine compounds can include, for example, melamine and an alkyl-substituted melamine, such as dimethyl melamine, or melamine and a cycloaliphatic guanamine, such as tetrahydrobenzoguanamine.

The intermediate amino-aldehyde reaction product and the first aldehyde compound can include one or more aldehyde compounds. The one or more aldehyde compounds can include, but are not limited to, unsubstituted aldehyde compounds and/or substituted aldehyde compounds. For example, suitable aldehyde compounds can be represented by the formula RCHO, wherein R is hydrogen or a hydrocarbon radical. Illustrative hydrocarbon radicals can include from 1 to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination thereof. One or more other aldehydes, such as glyoxal can be used in place of or in combination with formaldehyde and/or other aldehydes. In at least one example, the aldehyde compound can include formaldehyde, UFC, or a combination thereof. As such, in at least one example, at least a portion of the first amino aldehyde compound and at least a portion of the first amino compound can be pre-reacted with one another such that the first aldehyde compound and the first amino compound include a pre-reacted product, e.g., urea-formaldehyde concentrate, containing one or more at least partially methylolated amino compounds.

The aldehyde can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), UFC, and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

The intermediate amino-aldehyde reaction product can be produced by reacting one or more aldehyde compounds with one or more amino compounds in two or more reaction steps. The first reaction step can be carried out under basic/alkaline reaction conditions or acidic reaction conditions to produce a first intermediate amino-aldehyde reaction product or "first intermediate." For example, the first reaction step can include reacting one or more aldehyde compounds with one or more amino compounds under basic reaction conditions (a pH of about 7 or more) to produce the first intermediate. In another example, the first reaction step can include reacting one or more aldehyde compounds with one or more amino compounds under acidic reaction conditions (a pH of less than about 7) to produce the first intermediate. The second reaction step can include reaction of the first intermediate under acidic reaction conditions to produce a second intermediate reaction product or the "intermediate amino-aldehyde reaction product." The first reaction step, whether carried out under basic or acidic conditions can also be referred to as a methylolation reaction or methylolation reaction step. The second reaction step can also be referred to as a condensation reaction or condensation reaction step. As such, the second intermediate reaction product or intermediate amino-aldehyde reaction product can also be referred to as an "intermediate condensation product" or "intermediate amino-aldehyde condensation product."

One or more aldehyde compounds or "second aldehyde compound" and one or more amino compounds or "second amino compound" can be mixed, blended, or otherwise combined with one another to produce a mixture or "reactant mixture" that can be reacted under basic or alkaline reaction conditions to produce the first intermediate. The first intermediate can be produced by reacting the second aldehyde compound, e.g., formaldehyde, and the second amino compound, e.g., urea and/or melamine, under basic or alkaline reaction conditions at a pH of greater than 7. In another example, the reactant mixture can be reacted at a pH ranging from a low of about 7, about 7.5, about 8, or about 8.5 to a high of about 9, about 9.5, about 10, about 10.5, or about 11. Reaction of the second aldehyde compound and second first amino compound can produce a first intermediate in which at least a portion of the amino compound has been methylolated. In other words, the first intermediate can include methylolated amino compounds.

The second aldehyde compound and the second amino compound can be combined with one another at a molar ratio ranging from about 1.4:1 to about 3:1. For example, the molar ratio of the second aldehyde compound to the second amino compound in the reactant mixture can range from a low of about 1.4:1, about 1.5:1, about 1.6:1, about 1.7:1, about 1.8:1, or about 1.9:1 to a high of about 2.2:1, about 2.4:1, about 2.5:1, about 2.6:1, about 2.7:1, about 2.8:1, about 2.9:1, or about 3:1. In another example, the second aldehyde compound and the second amino compound can be reacted under basic or alkaline conditions at a molar ratio of from about 1.6:1 to about 2.6:1, about 1.6:1 to about 2.5:1, about 1.7:1 to about 2.4:1, about 1.7:1 to about 2.3:1, about 1.8:1 to about 2.5:1, or about 1.9:1 to about 2.4:1.

One or more bases or alkaline compounds can be added before and/or during the reaction of the second aldehyde compound and the second amino compound (reactant mixture) to maintain and/or adjust the pH thereof. Suitable bases or alkaline compounds can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, cesium hydroxide, or any combination thereof. Illustrative carbonates can include, but are not limited to, sodium carbonate, potassium carbonate, ammonium carbonate, or any combination thereof. Illustrative amines can include, but are not limited to, alkanolamines, polyamines, aromatic amines, or any combination thereof. Illustrative alkanolamines can include, but are not limited to, monoethanolamine ("MEA"), diethanolamine ("DEA"), triethanolamine ("TEA"), or any combination thereof. Preferably, the alkanolamine is a tertiary alkanolamine or more preferably triethanolamine ("TEA"). An alkanolamine is defined as a compound that has both amino and hydroxyl functional groups as illustrated by diethanolamine, triethanolamine, 2-(2-aminoethoxy) ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine ("DETA"), triethylenetetramine ("TETA"), tetraethylenepentamine ("TEPA"). Other polyamines can include, for example, 1,3-propanediamine, 1,4-butanediamine, polyamidoamines, polyethylenimines, or any combination thereof.

Other suitable amines can include, but are not limited to, primary amines ("$NH_2R_1$"), secondary amines ("$NHR_1R_2$"), and tertiary amines ("$NR_1R_2R_3$"), where each $R_1$, $R_2$, and $R_3$ can be independently selected from alkyls, cycloalkyls, heterocycloalkyls, aryls, heteroaryls, and substituted aryls. The alkyl can include branched or unbranched alkyls having from 1 to 15 carbon atoms or more preferably from 1 to 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups can contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine, ethylamine, or a combination thereof. Illustrative secondary amines can include, but are not limited to, dimethylamine, diethylamine, or a combination thereof. Illustrative tertiary amines can include, but are not limited to, trimethylamine, triethylamine, or a combination thereof.

In addition to controlling or adjusting the pH, some base compounds can act as a pH buffer, which can improve or help maintain a desired pH during reaction of the reactant mixture under the basic or alkaline reaction conditions. Illustrative bases that can also act as a pH buffer can include, but are not limited to, triethanolamine, sodium borate, potassium bicarbonate, sodium carbonate, potassium carbonate, or any combination thereof.

The reactant mixture can be reacted at any desired temperature or over a range of two or more temperatures. For example, the reactant mixture can be reacted at room temperature. In another example, the reactant mixture can be reacted at an elevated temperature. Increasing the temperature of the reactant mixture during the reaction thereof can accelerate or increase the rate of reaction. The reaction can be carried out at a temperature ranging from a low of about 50° C., about 60° C., or about 70° C. to a high of about 80° C., about 90° C., or about 100° C. In another example, the reaction can be initiated or started at a first temperature, e.g., room temperature, and can be heated to a second temperature, e.g., about 90° C., during the reaction.

The reactant mixture can be reacted for any desired length or amount of time. For example, the reactant mixture can be reacted for a time ranging from a low of about 1 minute, about 5 minutes, about 10 minutes, or about 15 minutes to a high of about 30 minutes, about 1 hour, about 2 hours, or about 3 hours. In another example, the reactant mixture can be reacted for about 15 minutes, about 20 minutes, about 25 minutes, about 30 minutes, about 35 minutes, or about 40 minutes.

The second aldehyde compound and the second amino compound, and, if used, the base compound, can be combined with one another in any order or sequence. For example, the second aldehyde compound can be introduced to a reaction vessel and the second amino compound can be added thereto. In another example, the second amino compound can be added to the reaction vessel and the second aldehyde compound can be added thereto. In another example, the second aldehyde compound and the second amino compound can be simultaneously added to the reaction vessel. If a base compound is used, the base compound can be added to the reaction vessel at any desired time with respect to the second aldehyde compound and the second amino compound. For example, the base compound can be added to the reaction vessel before the second aldehyde compound and/or the second amino compound, simultaneously with the second aldehyde compound and/or the second amino compound, and/or after the second aldehyde compound and/or the second amino compound.

As used herein, the term "reaction vessel" refers to any container system of contains suitable for reacting the second aldehyde compound and the second amino compound with one another. For example, the reaction vessel can include an enclosed body or container capable of carrying out the reaction under vacuum, at atmospheric pressure, or at a pressure greater than atmospheric pressure. The reaction vessel can include cooling coils, heating coils, or other cooling and/or heating devises or systems. The reaction vessel can include one or more mixing devices or stirrers.

The reaction of the reactant mixture can be carried out in a liquid medium. For example, the reaction of the reactant mixture can be carried out in water, i.e., an aqueous mixture. In another example, the reaction of reactant mixture can be carried out in a non-aqueous liquid medium or solvent. Illustrative solvents can include, but are not limited to, methanol, acetonitrile, or a combination thereof. In another example, the reaction of the reactant mixture can be carried out in a mixture of water and one or more non-aqueous liquid or solvent mediums such as methanol.

The one or more aldehyde compounds or "second aldehyde compound" and the one or more amino compounds or "second amino compound" can be mixed, blended, or otherwise combined with one another to produce a reactant mixture that can be reacted under acidic reaction conditions to produce the first intermediate. The first intermediate can be produced by reacting the second aldehyde compound, e.g., formaldehyde, and the second amino compound, e.g., urea and/or melamine, under acidic reaction conditions at a pH of less than about 7. For example, the second aldehyde compound and the second amino compound can be reacted at a pH ranging from a low of about 3, about 3.5, about 4, or about 4.5 to a high of about 5.5, about 6, or about 6.5. In another example, the reactant mixture can be reacted at a pH ranging from about 1.5 to about 6, about 5 to about 5.5, about 5.2 to about 5.8, about 5 to about 6, or about 4 to about 6. Reaction of the second aldehyde compound and the second amino compound can produce a first intermediate in which at least a portion of the amino compound has been methylolated. In other words, the first intermediate can include methylolated amino compounds.

The second aldehyde compound and the second amino compound can be combined with one another at a molar ratio ranging from about 2.8:1 to about 5:1. For example, the molar ratio of the second aldehyde compound to the second amino compound in the reactant mixture can range from a low of about 3:1, about 3.2:1, about 3.3:1, about 3.4:1, or about 3.5:1 to a high of about 4.5:1, about 4.6:1, about 4.7:1, about 4.8:1, about 4.9:1, or about 5:1. In another example, the second aldehyde compound and the second amino compound can be reacted under acidic conditions at a molar ratio of from about 3:1 to about 5:1, about 3:1 to about 4:1, about 3.1:1 to about 3.9:1, about 3.2:1 to about 3.7:1, about 2.8:1 to about 3.7:1, or about 3:1 to about 3.7:1.

Prior to the reaction, during the reaction, and/or after the reaction between the second aldehyde compound and the second amino compound, one or more acidic compounds can be added to lower the pH of the reactant mixture and/or the first intermediate. Suitable acids can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bicarbonate, sodium hydrosulfide, sodium bisulfate, sodium metabisulfite, or any combination thereof.

The reaction of the reactant mixture can be maintained at any desired temperature. For example, the reactant mixture can be maintained at a temperature ranging from about room temperature to about 100° C. Heat from the exothermic reaction of the reactant mixture can be allowed to heat the reaction mixture to a temperature ranging from a low of about 50° C., about 60° C., or about 65° C. to a high of about 75° C., about 80° C., about 90° C., or about 100° C. The second aldehyde compound can be combined with the second amino compound at a rate suitable for controlling the heat generated by the reaction. For example, the second amino compound can be added to the second formaldehyde compound in separate portions or batches, continuously over a suitable period of time, or a combination thereof, such that the temperature of the reaction mixture is maintained at a desired temperature. In another example, one or more cooling devices, such as a cooling cool, can be disposed about the vessel and/or within the reaction mixture thereby transferring heat from the reaction mixture.

The reactant mixture can be reacted for any desired length or amount of time. For example, the reactant mixture can be reacted for a time ranging from a low of about 1 minute, about 5 minutes, about 10 minutes, or about 15 minutes to a high of about 30 minutes, about 1 hour, about 2 hours, or about 3 hours. In another example, the reactant mixture can be reacted for about 15 minutes, about 20 minutes, about 25 minutes, about 30 minutes, about 35 minutes, or about 40 minutes.

The second aldehyde compound and the second amino compound, and, if used, the acidic compound, can be combined with one another in any order or sequence. For example, the second aldehyde compound can be introduced to a reaction vessel and the second amino compound can be added thereto. In another example, the second amino compound can be added to the reaction vessel and the second aldehyde compound can be added thereto. In another example, the second aldehyde compound and the second amino compound can be simultaneously added to the reaction vessel. If an acidic compound is used, the acidic compound can be added to the reaction vessel at any desired time with respect to the second aldehyde compound and the second amino compound. For example, the acidic compound can be added to the reaction vessel before the second aldehyde compound and/or the second amino compound, simultaneously with the second aldehyde compound and/or the second amino compound, and/or after the second aldehyde compound and/or second first amino compound.

The reaction of the reactant mixture can be carried out in a liquid medium. For example, the reaction of the reactant mixture can be carried out in water, i.e., an aqueous mixture. In another example, the reaction of the reactant mixture can be carried out in a non-aqueous liquid medium or solvent, such as methanol, acetonitrile, or combinations thereof. In another example, the reaction of the reactant mixture can be carried out in a mixture of water and a non-aqueous liquid medium such as methanol.

The first intermediate produced via basic reaction conditions or acidic reaction conditions can include the second aldehyde compound, the second amino compound, a methylolated amino compound, or any combination thereof. For example, in the context of a first intermediate produced by reacting formaldehyde and urea under alkaline reaction conditions, the first intermediate can include formaldehyde, urea, methylolated urea, or any combination thereof. The methylolated urea can include monomethylurea, dimethylurea, trimethylurea, or any combination thereof.

The first intermediate produced via basic reaction conditions or acidic reaction conditions can be further reacted under acidic conditions to produce the second intermediate reaction product or the intermediate amino-aldehyde product. For example, the first intermediate can be reacted at a pH of less than about 7. If the first intermediate is produced under basic reaction conditions, one or more acids can be combined with the first intermediate in a sufficient amount to reduce the pH thereof to less than about 7. If the first intermediate is produced under acidic reaction conditions, one or more acids can be combined with the first intermediate, if needed or as needed, in order to adjust the pH thereof to less than about 7. The pH of the first intermediate can be adjusted such that the first intermediate has a pH of from about 3 to about 7. For example, the pH of the first intermediate can be reduced to a pH ranging from a low of about 4, about 4.5, about 4.7, or about 5 to a high of about 5.5, about 5.7, about 6, or about 6.5. In another example, the pH of the first intermediate can be reduced to a pH of from about 4.5 to 5, about 5 to about 5.5, about 5.5 to about 6, about 4.8 to about 5.8, about 5.1 to about 5.4, or about 5.1 to about 5.5.

Additionally, if the first intermediate is produced under acidic reaction conditions, an amino compound or "third amino compound" can be added to the reactant mixture during reaction thereof and/or after reaction of the reactant mixture in order to adjust the molar ratio of the second aldehyde compound to the second amino compound. For example, the reactant mixture produced under acidic reaction conditions can have a molar ratio of the second aldehyde compound to the second amino compound ranging from about 3:1 to about 6:1. Adding the third amino compound thereto can adjust or alter the molar ratio of the second aldehyde compound to the combined amount of the second and third aldehyde compounds to range from a low of about 1.4:1, about 1.5:1, about 1.6:1, about 1.7:1, about 1.8:1, or about 1.9:1 to a high of about 2.5:1, about 2.6:1, about 2.7:1, about 2.8:1, about 2.9:1, or about 3:1. The third amino compound can include, but is not limited to, urea, melamine, or a combination thereof.

The reaction of the first intermediate under acidic conditions can polymerize or condense the first intermediate product to produce the intermediate amino-aldehyde product. As such, the reaction of the first intermediate product to produce the intermediate amino-aldehyde reaction product can be referred to as a condensation or polymerization reaction. The reaction of the first intermediate under acidic conditions can be carried out or continued until the intermediate amino-aldehyde reaction product exhibits one or more desired properties.

In another example, the reaction of the first intermediate can be carried out until an intermediate amino-aldehyde reaction product having a desired water dilutability has been produced. For example, the first intermediate can be reacted until a small sample of the reactant mixture, when mixed with water, looses solubility and forms a precipitate in the water. The temperature of the water and first intermediate, when mixed together, can be at about 25° C., for example.

The reaction of the first intermediate under acidic conditions can optionally include mixing, blending, or otherwise combining another amino compound or "fourth amino compound" in one or more steps or stages during the condensation or polymerization of the first intermediate. For example, the molar ratio of the total aldehyde compound to total amino compound of the reaction mixture can be reduced from an initial molar ratio to a lower molar ratio. In other words, the fourth amino compound can be added during reaction of the first intermediate to reduce the amount of aldehyde compound(s) therein relative to the amount of amino compound(s) therein. For example, at the start of the reaction of the first intermediate, the first intermediate can have a molar ratio of aldehyde compounds to amino compounds ranging from about 1.4:1 to about 3:1. During the reaction of the first intermediate the fourth amino compound can be added in one or more additions or steps or continuously thereto to produce an intermediate amino-aldehyde product having a molar ratio of aldehyde compounds to amino compounds ranging anywhere from about 0.8:1 to about 2.9:1. The fourth amino-aldehyde compound can include, but is not limited to, urea, melamine, or a combination thereof. In another example, the reaction can be carried out with or without the addition of the fourth amino compound to produce the intermediate amino-aldehyde reaction product having a predetermined maximum amount of unreacted or "free" aldehyde compound(s) therein.

The first intermediate product can be reacted under acidic conditions at any desired temperature or range of temperatures to produce the second intermediate product. For example, the first intermediate can be reacted at room temperature under acidic conditions. In another example, the reaction of the first intermediate under acidic conditions can be carried out at a temperature ranging from a low of about 50° C., about 60° C., or about 70° C. to a high of about 80° C., about 90° C., or about 100° C. In another example, the reaction can be initiated or started at a first temperature, e.g., room temperature, and can be heated to a second temperature, e.g., about 90° C., during the reaction. Exothermic heat generated during the condensation reaction can be used to heat the reaction mixture. In another example, the reaction can be initiated or started at an elevated temperature, e.g., from about 80° C. to about 90° C., and cooled to a second, lower temperature.

The reaction of the first intermediate product under acidic conditions can be carried out for any desired length or amount of time. For example, the reaction can be carried out at an elevated temperature, e.g., about 50° C. to about 85° C., for a time ranging from a low of about 30 minutes, about 45 minutes, or about an hour to a high of about 2 hours, about 3 hours, about 4 hours, or about 5 hours.

The reaction of the first intermediate can be carried out to produce the intermediate amino-aldehyde reaction product having a desired viscosity. The viscosity of the intermediate amino-aldehyde reaction product can range from a low of about 200 cP, about 250 cP, about 300 cP, about 350 cP, about 400 cP, about 450 cP, about 500 cP, about 550 cP, about 600 cP, about 650 cP, about 700 cP, about 750 cP, about 800 cP, about 850 cP, about 900 cP, about 950 cP, about 1,000 cP, or about 1,050 cP to a high of about 1,150 cP, about 1,200 cP, about 1,250 cP, about 1,300 cP, about 1,350 cP, about 1,400 cP, about 1,500 cP, about 1,600 cP, about 1,700 cP, about 1,800 cP, about 1,900 cP, or about 2,000 cP at a temperature of 25° C. In another example, the viscosity of the intermediate amino-aldehyde reaction product can be at least 500 cP, at least 600 cP, at least 700 cP, at least 800 cP, at least 900 cP, at least 1,000 cP, or at least 1,100 cP. In another example, the viscosity of the intermediate amino-aldehyde reaction product can range from about 900 cP to about 1,400 cP, about 1,000 cP to about 1,500 cP, about 1,000 cP to about 1,350 cP, about 1,050 cP to about 1,450 cP, about 1,100 cP to about 1,250 cP, about 1,150 cP to about 1,350 cP, or about 1,050 cP to about 1,600 cP at a temperature of 25° C.

The viscosity of the intermediate amino-aldehyde reaction product and/or the amino-aldehyde resins discussed and described herein can be determined using a Brookfield Viscometer at a temperature of 25° C. For example, a Brookfield viscometer, Model DV-II+, with a small sample adapter can be used. The small sample adapter can allow the sample to be cooled or heated by the chamber jacket to maintain the temperature of the sample surrounding the spindle at a temperature of 25° C.

When the condensation or polymerization of the first intermediate has been completed or is desired to be completed, the pH of the second intermediate can be increased to provide the intermediate amino-aldehyde reaction product having a neutral or basic pH. Increasing the pH such that the reaction product is neutralized or made basic can stop the condensation or polymerization of the reaction product thereby producing the intermediate amino-aldehyde reaction product. Depending on the particular composition of the intermediate amino-aldehyde reaction product, the particular pH required to reduce, terminate, or stop the condensation or polymerization of the reaction product can vary. For example, when the intermediate amino-aldehyde reaction product includes a urea-formaldehyde resin, the first aldehyde compound includes formaldehyde, and the first amino compound includes urea, the condensation or polymerization of the reaction mixture can be terminated or substantially terminated by increasing the pH thereof to about 7 or more, about 7.5 or more, or about 8 or more. In another example, when the intermediate amino-aldehyde reaction product includes a melamine-urea-formaldehyde resin, the first aldehyde compound includes formaldehyde, and the first amino compound includes urea, the condensation or polymerization of the reaction mixture can be terminated or substantially terminated by increasing the pH thereof to about 8.5 or more. The pH of the intermediate amino-aldehyde reaction product can be adjusted to about 7 or more. For example, the pH of the intermediate amino-aldehyde reaction product can range from a low of about 7, about 7.3, or about 7.5 to a high of about 8, about 8.5, about 9, about 9.5, about 10, about 10.5, about 11, about 11.5, or about 12.

Once the intermediate amino-aldehyde reaction product has been produced, the first amino compound and the first aldehyde compound can be added thereto to produce the amino-aldehyde resin or binder, as discussed and described above. Additional details for reacting one or more aldehyde compounds with one or more amino compounds to produce a suitable intermediate amino-aldehyde reaction product can be as discussed and described in U.S. Pat. Nos. 5,362,842; 5,674,971; 5,681,917; 5,684,118; 5,710,239; 6,566,459. For example, in addition to the first amino compound, one or more additional compounds such as ammonia can be added to the intermediate amino-aldehyde reaction product as discussed and described in U.S. Pat. No. 5,674,971.

The intermediate amino-aldehyde reaction product can be free of or substantially free of any catalysts or accelerators when the first aldehyde compound and the first amino compound are added thereto to produce the amino-aldehyde resin or binder. As such, the amino-aldehyde resin can also be free of or substantially free of any catalysts or accelerators. As used herein, the terms "substantially free of" and "free of" refer to an intermediate amino-aldehyde reaction product and an amino-aldehyde resin to which no catalyst or accelerator is intentionally added. As used herein, the terms "catalyst" and "accelerator" are used interchangeably and refer to any compound(s) or substance(s) that can intentionally be added to the amino-aldehyde resin in order to increase curing thereof.

The amino-aldehyde resin can be used in the production of one or more products, stored on site for future use, transported to another location and stored and/or used in the production of one or more products, or any combination thereof. The amino-aldehyde resin can have a shelf life of about 1 day or more, about 2 days or more, about 3 days or more, about 4 days or more, about 5 days or more, about 6 days or more, about one week or more, about two weeks or more, about 3 weeks or more, or about 4 weeks or more. In other words, the amino-aldehyde resin produced by mixing the intermediate amino-aldehyde reaction product with the first amino compound and the first aldehyde compound can be a stable product having a shelf life ranging from a day, several days, or a month, to more than a month.

One or more latent catalysts or latent accelerators can be mixed, blended, or otherwise combined with the amino-aldehyde resin to provide or produce a catalyst/accelerator containing amino-aldehyde resin. As used herein, the terms "latent catalyst" and "latent accelerator" are used interchangeably and refer to catalysts that remain inactive or substantially inactive until triggered. For example, heat, pressure, electron beam, light, and the like, or combinations thereof, can be used to trigger or activate a latent catalyst or latent accelerator. Illustrative latent catalysts that can be combined with the amino-aldehyde resin can include, but are not limited to, one or more metal salts. Other latent catalysts can include, but are not limited to, triethylamine sulfate, triethylamine phosphate, triethylamine chloride, trimethylamine sulfate, trimethylamine phosphate, trimethylamine chloride, tripropylamine sulfate, tripropylamine phosphate, tripropylamine chloride, sodium sulfate, sodium phosphate, sodium chloride, or any combination thereof. Any two or more catalysts can be used in combination with one another.

The amount of the catalyst combined or otherwise added with the amino-aldehyde resin can range from about 0.1 wt % to about 15 wt %, based on the combined weight of the amino-aldehyde resin and the catalyst. For example, the amount of the catalyst combined with the amino-aldehyde resin can range from a low of about 0.3 wt %, about 0.5 wt %, or about 1 wt % to a high of about 3 wt %, about 5 wt %, about 7 wt %, about 9 wt %, about 11 wt %, or about 13 wt %, based on the combined weight of the amino-aldehyde resin and the catalyst.

In addition to the catalyst, one or more aldehyde compounds or "third aldehyde compound" can be mixed, blended, or otherwise combined with the amino-aldehyde resin. The one or more aldehyde compounds or third aldehyde compounds can also be referred to as a "catalyst accompanying aldehyde compound." The third aldehyde compound can be added with the catalyst, after the catalyst, or a both. The amount of the third aldehyde compound that can be added along with the catalyst and/or after the catalyst to the amino-aldehyde resin can range from about 1 wt % to about 50 wt %, based on a total combined solids weight of the aldehyde compound(s) in the amino-aldehyde adhesive. For example, the amount of the third aldehyde compound added to the amino-aldehyde resin can range from a low of about 1 wt %, about 2 wt %, about 3 wt %, about 4 wt %, or abut 5 wt % to a high of 10 wt %, about 15 wt %, about 20 wt %, about 25 wt %, or about 30 wt %, based on the total combined solids weight of the aldehyde compound(s) in the amino-aldehyde resin. The addition of the third aldehyde compound to the amino-aldehyde resin can be as discussed and described in U.S. Pat. No. 6,881,817.

In addition to the catalyst and the optional third aldehyde compound, one or more additives can also be mixed, blended, or otherwise combined with either the amino-aldehyde resin or the amino-aldehyde adhesive. Illustrative additives can include, but are not limited to, waxes or other hydrophobic additives, water, filler material(s), extenders, surfactants, release agents, dyes, fire retardants, formaldehyde scavengers, and the like. For cellulose containing products, such as plywood, typical filler material(s) can include, but are not limited to, ground pecan and/or walnut shells and typical extenders can include, for example, wheat flour.

The amino-aldehyde resin, with or without the optional catalyst(s), third aldehyde compound, and/or other additives, can be used to make, produce, or otherwise prepare a variety of products. For example, the amino-aldehyde resin can be applied to a plurality of particulates, which can be formed into a desired shape before or after application of the amino-aldehyde adhesive, and then the amino-aldehyde resin can be at least partially cured to produce a particulate containing product or composite product. In another example, the amino-aldehyde resin can be applied to a plurality of cellulose particles and at least partially cured to produce cellulose based or cellulose containing products or composites. In another example, the amino-aldehyde resin can be applied to a wood or other cellulose based veneer and/or substrate and the amino-aldehyde resin can be at least partially cured to adhere the veneer to the substrate. In another example, the amino-aldehyde resin can be applied to a plurality of glass fibers, formed into a mat, and then at least partially cured to produce a glass mat.

The particulates can include, but are not limited to, organic based particulates, inorganic based particulates, or a combination thereof. Suitable organic based particulates can include but are not limited to, lignocellulosic material (particles that comprise both cellulose and lignin), straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus Hesperaloe in the family Agavaceae jute, salt water reeds, palm fronds, flax, ground nut shells, hardwoods, softwoods, recycled fiberboards such as high density fiberboard, medium density fiberboard, low density fiberboard, oriented strand board, particle board, animal fibers (e.g., wool, hair), recycled paper products (e.g., newspapers, cardboard, cereal boxes, and magazines), or any combination thereof. For example, organic based particulates can be or include wood, for example hardwoods, softwoods, or a combination thereof. Illustrative types of wood can include, but are not limited to, Alder, Ash, Aspen, Basswood, Beech, Birch, Cedar, Chemy, Cottonwood, Cypress, Elm, Fir, Gum, Hackberry, Hickory, Maple, Oak, Pecan, Pine, Poplar, Redwood, Sassafras, Spruce, Sycamore, Walnut, and Willow. Inorganic based fibers can include, but are not limited to plastic fibers (e.g., polypropylene fibers, polyethylene fibers, polyvinyl chloride fibers, polyester fibers, polyamide fibers, polyacrylonitrile fibers), glass fibers, glass wool, mineral fibers, mineral wool, synthetic inorganic fibers (e.g., aramid fibers, carbon fibers), ceramic fibers, and any combination thereof. In one or more embodiments, organic and inorganic based fibers can be combined to provide the fibers in the fiberboard.

The starting material, from which the particulates can be derived from, can be reduced to the appropriate size by various processes such as hogging, grinding, hammer milling, tearing, shredding, and/or flaking. Suitable forms of the particulates can include, but are not limited to, chips, fibers, shavings, sawdust or dust, or the like. The particulates can have a length ranging from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

Illustrative cellulose containing products or articles produced using the amino-aldehyde adhesive can include, but are not limited to, particle board, fiberboard such as medium density fiberboard ("MDF") and/or high density fiberboard ("HDF"), plywood such as hardwood plywood and/or softwood plywood, oriented strand board ("OSB"), laminated veneer lumber ("LVL"), laminated veneer boards ("LVB"), and the like.

The production of cellulose containing and other particulate containing products can include contacting a plurality of particulates with the amino-aldehyde resin. The particulates can be contacted with the amino-aldehyde resin by spraying, coating, mixing, brushing, falling film or curtain coater, dipping, soaking, or the like. After contacting the plurality of particulates with the amino-aldehyde resin, the amino-aldehyde resin can be at least partially cured. At least partially curing the amino-aldehyde resin can include applying heat thereto. In another example, at least partially curing the amino-aldehyde resin can include combining or otherwise adding one or more catalysts/accelerators thereto and allowing the catalyst/accelerator containing amino-aldehyde resin to at least partially cure at room temperature. The particulates contacted with the amino-aldehyde resin can be formed into a desired shape, e.g., a woven mat or a non-woven mat. The particulates contacted with the amino-aldehyde resin can be formed into a desired shape before, during, and/or after partial curing of the amino-aldehyde resin. Depending on the particular product, the particulates contacted with the amino-aldehyde resin can be pressed before, during, and/or after the amino-aldehyde resin is at least partially cured. For example, the particulates contacted with the amino-aldehyde resin can be consolidated or otherwise formed into a desired shape, if desired pressed to a particular density and thickness, and heated to at least partially cure the amino-aldehyde resin. In another example, a blended furnish, i.e., a mixture of the particulates and the amino-aldehyde resin, can be extruded through a die (extrusion process) and heated to at least partially cure the amino-aldehyde resin. The catalysts/accelerators can include one or more metal salts. Illustrative metal salts can include, but are not limited to, salts of sodium, potassium, aluminum, magnesium, zinc, or any combination thereof. For example, the catalyst can be or include sodium nitrate, aluminum sulfate, ammonium hydrogen phosphate, ammonium persulfate, ammonium chloride, ammonium nitrate, ammonium sulfate, or any combination thereof.

The pressure applied in producing the product can depend, at least in part, on the particular product. For example, the amount of pressure applied to a particle board process can range from about 1 MPa to about 5 MPa or from about 2 MPa to about 4 MPa. In another example, the amount of pressure applied to a MDF product can range from about 2 MPa to about 7 MPa or from about 3 MPa to about 6 MPa. The temperature the product can be heated to produce an at least partially cured product can range from a low of about 100° C., about 125° C., about 150° C., or about 170° C. to a high of about 180° C., about 200° C., about 220° C., or about 250° C. The length of time the pressure can be applied can range from a low of about 3 minutes, about 5 minutes, or about 7 minutes to a high of about 10 minutes, about 15 minutes, about 20 minutes, or about 30 minutes, which can depend, at least in part, on the particular product and/or the particular dimensions, e.g., thickness of the product.

For cellulose based or cellulose containing products such as particle board, fiberboard, plywood, and oriented strand board, the amount of the amino-aldehyde resin applied to the cellulose material can range from a low of about 3 wt %, about 4 wt %, about 5 wt % or about 6 wt % to a high of about 10 wt %, about 12 wt %, about 15 wt %, or about 20 wt %, based on the combined weight of the cellulose material and the amino-aldehyde resin.

Cellulose based or cellulose containing products such as particle board, fiberboard, plywood, and oriented strand board, can have a thickness ranging from a low of about 1.5 mm, about 5 mm, or about 10 mm to a high of about 30 mm, about 50 mm, or about 100 mm. Cellulose based or cellulose containing products can be into sheets or boards. The sheets or boards can have a length of about 1.2 m, about 1.8 m, about 2.4 m, about 3 m, or about 3.6 m. The sheets or boards can have a width of about 0.6 m, about 1.2 m, about 1.8 m, about 2.4 m, or about 3 m.

Cellulose based composite products produced with the binder compositions discussed and described herein can have an internal bond strength that is greater relative to a comparative composite product produced under the similar conditions but with a comparative amino-aldehyde resin. The comparative amino-aldehyde resin can be produced under similar conditions, but without the addition of the first aldehyde compound in an amount of about 1.7 wt % or more based on a combined solids weight of aldehyde compounds and amino compounds in the comparative amino-aldehyde resin. For example, a composite product such as a composite panel produced with the amino-aldehyde resins discussed and described herein can have an internal bond strength that is greater relative to a comparative composite product produced under the same conditions, but with the comparative amino-aldehyde resin not having the addition of the first aldehyde compound in an amount of about 1.7 wt % or more based on a combined solids weight of aldehyde compounds and amino compounds in the comparative amino-aldehyde resin, in an amount of about 1% or more, about 3% or more, about 5% or more, about 10% or more about 15% or more about 20% or more, about 25% or more, about 30% or more, about 35% or more, about 40% or more, or about 45% or more. In another example, a composite product such as a composite panel produced with the amino-aldehyde resins discussed and described herein can have an internal bond strength that is greater relative to a comparative composite product produced under the same conditions but with the comparative amino-aldehyde resin in an amount ranging from a low of about 1%, about 3%, about 5%, about 8%, about 10%, or about 12% to a high of about 15%, about 18%, about 20%, about 25%, about 30%, about 35%, about 40%, about 45%, or about 50%, with suitable ranges including the combination of any lower amount and any upper amount.

Another class or type of particulate containing or composite products for which the amino-aldehyde resin can be used to produce can include, but are not limited to, fiberglass mats, fiberglass insulation, and other fiber containing products. Fiberglass mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The white water can typically contain about 0.5 wt % fibers. The fibers can have a diameter ranging from about 0.5 μm to about 30 μm and a length ranging from about 5 mm to about 50 mm, for example. The fibers can be sized or unsized and wet or dry, as long as the fibers can be suitably dispersed within the aqueous fiber slurry.

The fiber slurry, diluted or undiluted, can be introduced to a mat-forming machine that can include a mat forming screen, e.g., a wire screen or sheet of fabric, which can form a fiber product and can allow excess water to drain therefrom, thereby forming a wet or damp fiber mat. The fibers can be collected on the screen in the form of a wet fiber mat and excess water is removed by gravity and/or by vacuum assist. The removal of excess water via vacuum assist can include one or more vacuums.

The amino-aldehyde adhesive can be formulated as a liquid and applied onto the dewatered wet fiber mat. Application of the amino-aldehyde adhesive can be accomplished by any conventional means, such as by soaking the mat in an excess of amino-aldehyde adhesive solution or suspension, a falling film or curtain coater, dipping, or the like. The amino-aldehyde resin can include, for example, from about 5 wt % to about 45 wt % solids. Excess amino-aldehyde resin can be removed, for example under vacuum.

The amino-aldehyde resin, after it is applied to the glass fibers, can be cured. For example, the fiberglass product can be heated to effect final drying and full curing. The duration and temperature of heating can affect the rate of processability and handleability, degree of curing and property development of the treated substrate. The curing temperature can be within the range of from about 50° C. to about 300° C., preferably within the range of from about 90° C. to about 230° C. and the curing time will usually be somewhere between 1 second to about 15 minutes. On heating, water present in the amino-aldehyde adhesive evaporates, and the composition undergoes curing.

The drying and curing of the amino-aldehyde resin can be conducted in two or more distinct steps. For example, the composition can be first heated at a temperature and for a time sufficient to substantially dry but not to substantially cure the amino-aldehyde resin and then heated for a second time at a higher temperature and/or for a longer period of time to effect curing (cross-linking to a thermoset structure). Such a preliminary procedure, referred to as "B-staging," may be used to provide a amino-aldehyde resin treated product, for example, in roll form, which may at a later stage be fully cured, with or without forming or molding into a particular configuration, concurrent with the curing process. This makes it possible, for example, to use fiberglass products which can be molded and cured elsewhere.

The amino-aldehyde resin can be blended with other additives or ingredients commonly used in compositions for preparing fiber products and diluted with additional water to a desired concentration which is readily applied onto the fibers, such as by a curtain coater. Illustrative additives can include, but are not limited to, dispersants, biocides, viscosity modifiers, pH adjusters, coupling agents, surfactants, lubricants, defoamers, and the like. For example, the amino-aldehyde resin or adhesive can be added to an aqueous solution ("white water") of polyacrylamide ("PAA"), amine oxide ("AO"), or hydroxyethylcellulose ("HEC"). In another example, a coupling agent (e.g., a silane coupling agent, such as an organo silicon oil) can also be added to the solution. In another example, a coupling agent can be incorporated in a coating on the fibers.

The fiberglass product can be formed as a relatively thin product having a thickness of about 0.1 mm to about 6 mm, can be formed. In another example, a relatively thick fiberglass product having a thickness of about 10 cm to about 50 cm, or about 15 cm to about 30 cm, or about 20 cm to about 30 cm can be formed. In another example, the fiberglass product can have a thickness ranging from a low of about 0.1 mm, about 1 mm, about 1.5 mm, or about 2 mm to a high of about 5 mm, about 1 cm, about 5 cm, about 10 cm, about 20 cm, about 30 cm, about 40 cm, or about 50 cm. Depending on formation conditions, the density of the product can also be varied from a relatively fluffy low density product to a higher density of about 6 pounds per cubic foot to about 10 pounds per cubic foot or higher. In one or more embodiments, the fiber mat product can have a basis weight ranging from a low of about 0.1 pound, about 0.5 pounds, or about 0.8 pounds to a high of about 3 pounds, about 4 pounds, or about 5 pounds per 100 square feet. For example, the fiber mat product can have a basis weight of from about 0.6 pounds per 100 square feet to about 2.8 pounds per 100 square feet, about 1 pound per 100 square feet to about 2.5 pounds per 100 square feet, or about 1.5 pounds per 100 square feet to about 2.2 pounds per 100 square feet. In at least one specific embodiment, the fiber mat product can have a basis weight of about 1.2 pounds per 100 square feet, about 1.8 pounds per 100 square feet, or about 2.4 pounds per 100 square feet.

The fibers can represent the principal material of the nonwoven fiber products, such as a fiberglass mat product. For example, 60 wt % to about 95 wt % of the fiberglass product, based on the combined amount of amino-aldehyde adhesive and fibers can be composed of the fibers. The amino-aldehyde resin can be applied in an amount such that the cured amino-aldehyde resin constitutes from about 1 wt % to about 40 wt % of the finished glass fiber product. The amino-aldehyde resin can be applied in an amount such that the cured resin constitutes a low of from about 1 wt %, about 5 wt %, or about 10 wt % to a high of about 15 wt %, about 20 wt %, or about 25 wt %, based on the combined weight of the resin and the fibers.

As used herein, the terms "fiber," "fibrous," "fiberglass," "fiber glass," "glass fibers," and the like refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers ("WUCS"). Wet use chopped strand glass fibers can be formed by conventional processes known in the art. The WUCS can have a moisture content ranging from a low of about 5%, about 8%, or about 10% to a high of about 20%, about 25%, or about 30%.

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

The amino-aldehyde resin discussed and described above or elsewhere herein can be used to produce a variety of fiberglass products. The fiberglass products can be used by themselves or incorporated into a variety of other products. For example, fiberglass products can be used as produced or incorporated into insulation batts or rolls, composite flooring, asphalt roofing shingles, siding, gypsum wall board, roving, microglass-based substrate for printed circuit boards, battery separators, filter stock, tape stock, carpet backing, and as reinforcement scrim in cementitious and non-cementitious coatings for masonry.

EXAMPLES

In order to provide a better understanding of the foregoing discussion, the following non-limiting examples are offered. Although the examples may be directed to specific embodiments, they are not intended to limit the invention in any respect. All parts, proportions, and percentages are by weight unless otherwise indicated.

Example I

Two inventive examples (Ex. 1 and 2) and one comparative example (CEx. 1) were prepared. Two samples for each example were prepared having a different amount of a catalyst mixed therewith. The onset of cure for each example was evaluated using Differential Scanning calorimetry ("DSC"), as described herein.

The comparative example (CEx. 1) was prepared according to the following procedure. About 2,028.5 grams of a 50% solution of formaldehyde, about 381.5 grams of Urea Formaldehyde Concentrate ("UFC") that had a formaldehyde to urea molar ratio of 4.6:1 and a solids concentration of 85%, and about 13.0 grams of water were added to a reaction vessel at room temperature and agitation was started. The pH of the mixture was adjusted to about 7.4 by adding a sufficient amount of 50% NaOH and heated to a temperature of about 100° C. About 1,208.0 grams of urea was then added to the reaction vessel to provide a mixture having a formaldehyde to urea molar ratio of about 1.90:1. The mixture was held at about 100° C. for about 20 minutes and then cooled to about 86° C. The pH of the mixture was then reduced to about 5.4 by adding a sufficient amount of ammonium sulfate thereto. Condensation of the mixture was carried out until a target viscosity of about 165 cP was reached. Then the pH of the mixture was adjusted to about 6.1 and about 112.0 grams of urea was added to provide a mixture having a formaldehyde to urea molar ratio of about 1.75:1. The mixture was further reacted until a target viscosity of about 320 cP was reached and then about 59.0 grams of urea was added to provide a mixture having a formaldehyde to urea molar ratio of about 1.68:1. The mixture was further reacted until a target viscosity of about 885 cP, at which time the mixture was cooled to 55° C. and the pH was increased to about 7.5 by adding a sufficient amount of 50% NaOH thereto, to produce an intermediate urea-formaldehyde reaction product. About 1,135.0 grams of urea was then added to the mixture to provide a urea-formaldehyde (UF) resin having a formaldehyde to urea molar ratio of about 0.95:1. For the comparative example (CEx. 1) no formaldehyde was added to the intermediate urea-formaldehyde reaction product. About 37.5 grams of sodium sulfate and about 25 grams of triethylamine sulfate were added while the UF resin was further cooled to room temperature to provide about 5,000 grams of a finished, stable UF resin product (CEx. 1) having a target viscosity of about 250 cP, a solids content of about 65%, and a pH of about 7.5. The viscosities in of the examples, i.e., CEx. 1 and Ex. 1 and 2, were measured with a Brookfield viscometer, Model DV-II+, with a small sample adapter at a temperature of 25° C.

Example 1 was prepared according to the following procedure. About 1,978.5 grams of a 50% solution of formaldehyde, about 381.5 grams of Urea Formaldehyde Concentrate ("UFC") that had a formaldehyde to urea molar ratio of 4.6:1 and a solids concentration of 85%, and about 12.5 grams of water were added to a reaction vessel at room temperature and agitation was started. The pH of the mixture was adjusted to about 7.4 by adding a sufficient amount of 50% NaOH and heated to a temperature of about 100° C. About 1,182.0 grams of urea was then added to the reaction vessel to provide a mixture having a formaldehyde to urea molar ratio of about 1.90:1. The mixture was held at about 100° C. for about 20 minutes and then cooled to about 86° C. The pH of the mixture was then reduced to about 5.4 by adding a sufficient amount of ammonium sulfate thereto. Condensation of the mixture was carried out until a target viscosity of about 165 cP was reached. Then the pH of the mixture was adjusted to about 6.1 by adding a sufficient amount of a 50% NaOH solution and about 109.5 grams of urea was also added to provide a mixture having a formaldehyde to urea molar ratio of about 1.75:1. The mixture was further reacted to until a target viscosity of about 320 cP was reached and then about 58.0 grams of urea was added to provide a mixture having a formaldehyde to urea molar ratio of about 1.68:1. The mixture was further reacted until a target viscosity of about 885 cP, at which time the mixture was cooled to 55° C. and the pH was increased to about 7.5 by adding a sufficient amount of 50% NaOH thereto, to produce an intermediate urea-formaldehyde reaction product. About 50.0 grams of a 50% solution of formaldehyde was then added to the intermediate urea-formaldehyde reaction product. Then about 1,165.0 grams of urea as added to the mixture to provide a UF resin having a final formaldehyde to urea molar ratio of about 0.95:1. The amount of formaldehyde added to the intermediate urea-formaldehyde reaction product in Example 1 was about 1 wt %, based on a total weight of urea and formaldehyde in the UF resin. About 37.5 grams of sodium sulfate and about 25 grams of triethylamine sulfate were added while the UF resin was further cooled to room temperature to provide about 5,000 grams of a finished, stable UF resin product (Ex. 1) having a target viscosity of about 250 cP, a solids content of about 65%, and a pH of about 7.5.

Example 2 was prepared according to the following procedure. About 1,928.5 grams of a 50% solution of formaldehyde, about 381.5 grams of Urea Formaldehyde Concentrate ("UFC") that had a formaldehyde to urea molar ratio of 4.6:1 and a solids concentration of 85%, and about 13.0 grams of water were added to a reaction vessel at room temperature and agitation was started. The pH of the mixture was adjusted to about 7.4 by adding a sufficient amount of 50% NaOH and heated to a temperature of about 100° C. About 1,155.5 grams of urea was then added to the reaction vessel to provide a mixture having a formaldehyde to urea molar ratio of about 1.90:1. The mixture was held at about 100° C. for about 20 minutes and then cooled to about 86° C. The pH of the mixture was then reduced to about 5.4 by adding a sufficient amount of ammonium sulfate thereto. Condensation of the mixture was carried out until a target viscosity of about 165 cP was reached. Then the pH of the mixture was adjusted to about 6.1 and about 109.5 grams of urea was added to provide a mixture having a formaldehyde to urea molar ratio of about 1.75:1. The mixture was further reacted until a target viscosity of about 320 cP was reached and then about 58.0 grams of urea was added to provide a mixture having a formaldehyde to urea molar ratio of about 1.68:1. The mixture was further reacted until a target viscosity of about 885 cP, at which time the mixture was cooled to 55° C. and the pH was increased to about 7.5 by adding a sufficient amount of 50% NaOH thereto, to produce an intermediate urea-formaldehyde reaction product. About 100.0 grams of a 50% solution of formaldehyde was then added to the intermediate urea-formaldehyde reaction product. Then about 1,194.5 grams of urea as added to the mixture to provide a UF resin having a final formaldehyde to urea molar ratio of about 0.95:1. The amount of formaldehyde added to the intermediate urea-formaldehyde reaction product in Example 2 was about 2 wt %, based on a total weight of urea and formaldehyde in the UF resin. About 37.5 grams of sodium sulfate and about 25 grams of triethylamine sulfate were added while the UF resin was further cooled to room temperature to provide about 5,000 grams of a finished, stable UF resin product (Ex. 1) having a target viscosity of about 250 cP, a solids content of about 65%, and a pH of about 7.5.

Differential Scanning calorimetry ("DSC") was used to evaluate the impact the addition of the 50.0 grams and 100.0 grams of 50% formaldehyde solution had on the cure speed of the resins of Examples 1 and 2, as compared to the comparative example (CEx. 1). Two samples for each example were examined For the first group of samples (CEx. 1A, Ex. 1A, and Ex. 2A), a portion of each UF resin product was mixed with a sufficient amount of ammonium sulfate $(NH_4)_2SO_4$, a catalyst, to provide UF resin products containing about 2.5 wt % ammonium sulfate. For the second group of samples (CEx. 1B, Ex. 1B, and Ex. 2B), a portion of each UF resin product was mixed with a sufficient amount of ammonium sulfate to provide UF resin products containing about 5 wt % ammonium sulfate.

For each DSC test, about 7.5 mg of each sample was added to a vented sample pan, which was then loaded along with an empty reference pan into a TA Instruments model 2920 DSC apparatus. Each sample was then tested using a dynamic heating mode. More particularly, the sample and reference were allowed to equilibrate at room temperature and then heated at a rate of about 5° C./minute in an air atmosphere. The temperature associated with the onset in the cure of each sample is shown in Table 1 below.

TABLE 1

| | Onset Temp., (° C.) | Amount of (NH4)2SO4, (wt %) | Amount of Formaldehyde Added to Intermediate Urea-Formaldehyde Reaction Product, (wt %) |
|---|---|---|---|
| CEx. 1A | 69.4 | 2.5 | 0.0 |
| Ex. 1A | 66.4 | 2.5 | 1.0 |
| Ex. 2A | 64.1 | 2.5 | 2.0 |
| CEx. 1B | 69.4 | 5.0 | 0.0 |
| Ex. 1B | 66.2 | 5.0 | 1.0 |
| Ex. 2B | 63.0 | 5.0 | 2.0 |

As shown in Table 1, the temperature associated with the onset of cure for Ex. 1 and Ex. 2 were both lower than the comparative example (CEx. 1). For example, the comparative example (CEx. 1) had an onset of cure at about 69.4° C., while Ex. 1 and Ex. 2 had an onset of cure at about 66.4° C. and about 64.1° C., respectively, when mixed with about 2.5 wt % $(NH_4)_2SO_4$. For the samples containing about 5.0 wt % $(NH_4)_2 SO_4$, the onset of cure for Ex. 1 and Ex. 2 was even further reduced relative to the comparative example (CEx. 1).

Additionally, as shown in Table 1 increasing the amount of the formaldehyde added to the intermediate urea-formaldehyde reaction product of Ex. 2, as compared to Ex. 1, further reduced the cure onset temperature by about 2° C. to about 3° C. Reducing the onset of cure for the UF resins in Ex. 1 and Ex. 2 can produce resins having a reduced amount of cure time as compared to the comparative example (CEx. 1). Also, the data shown in Table 1 demonstrates that at low formaldehyde to urea molar ratios, Ex. 1 and Ex. 2, which included the additional formaldehyde added to the intermediate urea-formaldehyde reaction product, continue to further benefit with the increased amount of catalyst that went from 2.5 wt % to 5 wt %, while the comparative example did not show any additional reduction in the onset of cure temperature.

Example II

Particleboard panel sets were made with a second comparative resin (CEx. 2), a third comparative resin (CEx. 3), and a third inventive resin (Ex. 3). Comparative example CEx. 2 had no formaldehyde added to the intermediate urea-formaldehyde reaction product. Comparative example CEx. 3 and inventive example EX. 3 included about 1.5 wt % and about 7.7 wt % formaldehyde, respectively, based on the total combined solids of urea and formaldehyde in the resins.

The comparative example (CEx. 2) was prepared according to the following procedure. About 2,351.0 grams of a 50% solution of formaldehyde and about 8.2 grams of water were added to a reaction vessel at room temperature and agitation was started. The pH of the mixture was adjusted to about 4.8 by adding a sufficient amount of 50% NaOH and heated to a temperature of about 100° C. About 589.0 grams of urea was then added to the reaction vessel to provide a mixture having a formaldehyde to urea molar ratio of about 3.99:1. The mixture was held at about 98° C. for about 20 minutes and then cooled to about 85° C. The pH of the mixture was then raised to about 5.0 by adding a sufficient amount of 50% NaOH thereto. About 616.5 grams of urea was then added to the reaction vessel to provide a mixture having a formaldehyde to urea molar ratio of about 1.95:1. Condensation of the mixture was carried out until a target viscosity of about 213 cP was reached. The pH of the mixture was adjusted to about 5.8 and about 96.0 grams of urea was added to provide a mixture having a formaldehyde to urea molar ratio of about 1.80:1. The mixture was further reacted until a target viscosity of about 440 cP was reached and then about 3.5 grams of triethylamine was added and the pH was increased to about 7.5 by adding a sufficient amount of 50% NaOH thereto. About 915.0 grams of urea was then added to the mixture at which time the mixture was cooled to provide a urea-formaldehyde (UF) resin having a formaldehyde to urea molar ratio of about 1.05:1. The mixture was held at about 55° C. for about 20 minutes and then further cooled to room temperature. No formaldehyde added to the intermediate urea-formaldehyde reaction product in CEx. 2. About 250.0 grams of NaCl and about 100.0 grams of Urea Formaldehyde Concentrate ("UFC") that had a formaldehyde to urea molar ratio of 4.6:1 and a solids concentration of 85% were then added. Then about 37.5 grams of sodium sulfate and about 25.0 grams of triethylamine sulfate were added while the UF resin was further cooled to room temperature to provide about 5,000.0 grams of a finished, stable comparative amino-aldehyde resin or comparative UF resin product (CEx. 2) having a target viscosity of about 289 cP, a solids content of about 65%, and a pH of about 7.5. The viscosities were measured with a Brookfield viscometer, Model DV-II+, with a small sample adapter at a temperature of 25° C.

The comparative example (CEx. 3) was prepared according to the following procedure. About 2,251.0 grams of a 50% solution of formaldehyde and 8.7 grams of water were added to a reaction vessel at room temperature and agitation was started. The pH of the mixture was adjusted to about 4.8 by adding a sufficient amount of 50% NaOH and heated to a temperature of about 100° C. About 564.0 grams of urea was then added to the reaction vessel to provide a mixture having a formaldehyde to urea molar ratio of about 4:1. The mixture was held at about 98° C. for about 20 minutes and then cooled to about 85° C. The pH of the mixture was then raised to about 5.0 by adding a sufficient amount of 50% NaOH thereto. About 590.0 grams of urea was then added to the reaction vessel to provide a mixture having a formaldehyde to urea molar ratio of about 1.95:1. Condensation of the mixture was carried out until a target viscosity of about 213 cP was reached. Then the pH of the mixture was adjusted to about 5.8 and about 96.0 grams of urea was added to provide a mixture having a formaldehyde to urea molar ratio of about 1.8.0:1. The mixture was further reacted until a target viscosity of about 515 cP was reached and then about 3.5 grams of triethylamine and the pH was increased to about 7.5 by adding a sufficient amount of 50% NaOH thereto. About 100.0 grams of a 50% solution of formaldehyde was then added to the intermediate urea-formaldehyde reaction product at which time the mixture was cooled to 75° C. About 970.5 grams of urea was then added to the mixture to provide a urea-formaldehyde (UF) resin having a formaldehyde to urea molar ratio of about 1.05:1. The mixture was held at about 55° C. for about 20 minutes and then further cooled to room temperature. The amount of formaldehyde added to the intermediate urea-formaldehyde reaction product in CEx. 3 was about 1.5 wt %, based on a total solids weight of urea and formaldehyde in the UF resin. About 250.0 grams of NaCl and about 100.0 grams of Urea Formaldehyde Concentrate ("UFC") that had a formaldehyde to urea molar ratio of 4.6:1 and a solids concentration of 85% were then added. Then about 37.5 grams of sodium sulfate and about 25.0 grams of triethylamine sulfate were added while the UF resin was further cooled to room temperature to provide about 5,000 grams of a finished, stable comparative amino-aldehyde resin or comparative UF resin product (CEx. 3) having a target viscosity of about 273 cP, a solids content of about 65%, and a pH of about 7.5. The viscosities were measured with a Brookfield viscometer, Model DV-II+, with a small sample adapter at a temperature of 25° C.

The inventive example Ex. 3 was prepared according to the following procedure. About 1,851.0 grams of a 50% solution of formaldehyde and 7.7 grams of water were added to a reaction vessel at room temperature and agitation was started. The pH of the mixture was adjusted to about 4.8 by adding a sufficient amount of 50% NaOH and heated to a temperature of about 100° C. About 464.0 grams of urea was then added to the reaction vessel to provide a mixture having a formaldehyde to urea molar ratio of about 3.98:1. The mixture was held at about 98° C. for about 20 minutes and then cooled to about 85° C. The pH of the mixture was then raised to about 5.0 by adding a sufficient amount of 50% NaOH thereto. About 485.5 grams of urea was then added to the reaction vessel to provide a mixture having a formaldehyde to urea molar ratio of about 1.95:1. Condensation of the mixture was carried out until a target viscosity of about 213 cP was reached. Then the pH of the mixture was adjusted to about 5.8 and about 79.0 grams of urea was added to provide a mixture having a formaldehyde to urea molar ratio of about 1.80:1. The mixture was further reacted until a target viscosity of about 1,180 cP was reached and then about 3.5 grams of triethylamine was added and the pH was increased to about 7.5 by adding a sufficient amount of 50% NaOH thereto. About 500.0 grams of a 50% solution of formaldehyde was then added to the intermediate urea-formaldehyde reaction product at which time the mixture was cooled to about 75° C. About 1,193.0 grams of urea was then added to the mixture to provide a urea-formaldehyde (UF) resin having a formaldehyde to urea molar ratio of about 1.05:1. The mixture was held at about 55° C. for about 20 minutes and then further cooled to room temperature. The amount of formaldehyde added to the intermediate urea-formaldehyde reaction product in Example 1 was about 7.7 wt %, based on a total solids weight of urea and formaldehyde in the UF resin. About 250.0 grams of NaCl and 100.0 grams of Urea Formaldehyde Concentrate ("UFC") that had a formaldehyde to urea molar ratio of 4.6:1 and a solids concentration of 85% were then added. Then about 37.5 grams of sodium sulfate and about 25.0 grams of triethylamine sulfate were added while the UF resin was further cooled to room temperature to provide about 5,000 grams of a finished, stable amino-aldehyde resin or UF resin product (Ex. 3) having a target viscosity of about 280 cP, a solids content of about 65%, and a pH of about 7.5. The viscosities were measured with a Brookfield viscometer, Model DV-II+, with a small sample adapter at a temperature of 25° C.

The particleboard panels made in CEx. 2, CEx. 3, and Ex. 3 were made with southern yellow pine wood furnish (moisture content of about 7 wt %). The wood furnish was added to a ribbon blender and under mechanical blending, the resins (CEx. 2, CEx. 3, and Ex. 3) were sprayed into the ribbon blender through an atomizer. The resins were combined with a 40 wt % solution ammonium sulfate (($NH_4)_2SO_4$) (catalyst) and a 45 wt % aqueous urea solution prior to adding to the wood furnish. The amount of the resin, catalyst, and urea solutions combined with the wood furnish were about 8 wt %, about 2 wt %, and about 11.5 wt %, respectively, based on the dry weight of the wood furnish.

The furnish-resin mixtures were spread into a 16 inch by 16 inch mat forming frame and manually pre-pressed. The mat forming frame was removed to provide pre-pressed or consolidated mats. The consolidated mats were placed into a hot press at a temperature of about 165.5° F. and subjected to a pressure sufficient to form a panel having a thickness of about 1.59 cm for 150 seconds (CEx. 2A, CEx. 3A, and Ex. 3A), 180 seconds (CEx. 2B, CEx. 3B, and Ex. 3B), and 210 seconds (CEx. 2C, CEx. 3C, and Ex. 3C). The formed panels were about 40.64 cm by about 40.64 cm by about 1.59 cm thick and had a target density of about 0.769 g/cm³. Ten samples from each panel were tested and the results were averaged.

The internal bond (IB) strength of each panel was measured according to the test procedure provided for in ASTM D1037-06a. The units of internal bond strength are in pounds per square inch ("psi"). The FIGURE depicts a graphical representation of the least squares means of the internal bond strength for CEx. 2, CEx. 3, and Ex. 3 at the three press times. Table 2 below shows the least squares means comparison of the internal bond strength between CEx. 2A-C and Ex. 3A-C. Table 3 below shows the least squares means comparison of the internal bond strength between CEx. 3A-C and Ex. 3A-C.

Referring to the FIGURE, the data points for comparative examples CEx. 2A-C are indicated with a (♦) symbol, the data points for comparative examples CEx. 3A-C are indicated with a (■) symbol, and the data points for examples Ex. 3A-C are indicated with a (●) symbol. As shown in the FIGURE, the internal bond strength of the panels made with the Ex. 3 amino-aldehyde resin surprisingly and unexpectedly showed improved internal bond strength at all three press times as compared to both comparative examples CEx. 2 and CEx. 3 panels, which showed a decrease in internal bond strength. Total curve analysis of the graph indicates that the panels made with the Ex. 3 amino-aldehyde resin were superior to the panels made with both comparative examples CEx. 2 and CEx. 3.

TABLE 2

Least Squares Means Comparison of Internal Bond Strength Between CEx. 2A-C and Ex. 3A-C

| Example | Press Time (sec.) | Mean | SD | 2.50% | Median | 97.50% |
|---|---|---|---|---|---|---|
| CEx. 2A | 150 | 81.78 | 6.09 | 69.70 | 81.82 | 93.81 |
| Ex. 3A | 150 | 92.55 | 4.91 | 82.72 | 92.51 | 102.30 |
| Difference in Means | | 10.77 | 7.79 | −4.60 | 10.76 | 26.31 |
| CEx. 2B | 180 | 112.10 | 3.83 | 104.70 | 112.10 | 119.60 |
| Ex. 3B | 180 | 117.60 | 5.06 | 107.60 | 117.50 | 127.60 |
| Difference in Means | | 5.42 | 6.37 | −7.23 | 5.52 | 18.00 |
| CEx. 2C | 210 | 106.40 | 6.67 | 93.05 | 106.40 | 119.80 |
| Ex. 3C | 210 | 123.00 | 6.33 | 110.40 | 122.90 | 135.90 |
| Difference in Means | | 16.53 | 9.17 | −1.66 | 16.51 | 34.97 |
| Total Curve Analysis | | 28.82 | 11.99 | 4.96 | 29.05 | 52.12 |

Table 2 shows that the least squares means of the internal bond strength for the panels of Ex. 3A-3C surprisingly and unexpectedly had greater internal bond strength than the corresponding comparative example CEx. 2 resins. More particularly, the mean IB strength of the Ex. 3A panel increased by about 13.17%, the mean IB strength of the Ex. 3B panel increased by about 4.9%, and the mean IB strength of the Ex. 3C panel increased by about 15.6% compared to the corresponding comparative example panels (CEx. 2A, 2B, and 2C).

TABLE 3

Least Squares Means Comparison of Internal Bond Strength Between CEx. 3A-C and Ex. 3A-C

| Example | Press Time (sec.) | Mean | SD | 2.50% | Median | 97.50% |
|---|---|---|---|---|---|---|
| CEx. 3A | 150 | 79.59 | 4.87 | 69.92 | 79.62 | 89.22 |
| Ex. 3A | 150 | 92.55 | 4.91 | 82.72 | 92.51 | 102.30 |
| Difference in Means | | 12.96 | 6.89 | −0.55 | 12.99 | 26.68 |
| CEx. 3B | 180 | 110.10 | 4.91 | 100.40 | 110.00 | 119.60 |
| Ex. 3B | 180 | 117.60 | 5.06 | 107.60 | 117.50 | 127.60 |
| Difference in Means | | 7.51 | 7.09 | −6.69 | 7.57 | 21.59 |
| CEx. 3C | 210 | 99.55 | 4.88 | 89.75 | 99.51 | 109.40 |
| Ex. 3C | 210 | 123.00 | 6.33 | 110.40 | 122.90 | 135.90 |
| Difference in Means | | 23.40 | 7.98 | 7.54 | 23.42 | 39.39 |
| Total Curve Analysis | | 39.26 | 11.41 | 16.34 | 39.53 | 61.56 |

Table 3 shows that the least squares means of the internal bond strength for the panels of Ex. 3A-3C surprisingly and unexpectedly had greater internal bond strength than the corresponding comparative example CEx. 3 resins. More particularly, the mean IB strength of the Ex. 3A panel increased by about 16.28%, the mean IB strength of the Ex. 3B panel increased by about 6.8%, and the mean IB strength of the Ex. 3C panel increased by about 23.56% compared to the corresponding comparative example panels (CEx. 2A, 2B, and 2C).

The main data analysis for comparative examples CEx. 2A-C, CEx. 3A-C, and Example 3A-C was done using Bayesian Statistics with the WinBugs program. The algorithm uses MCMC (Markov Chain Monte Carlo) methods to generate points (10,000 points) that map out the curve that best fits the data set. From these simulated data sets the difference of the mean can be determined along with the variation of the difference set. If zero can be in this difference set (at the 95% confidence level), then the two sets are considered to be statistically equivalent. If zero is not in this difference data set, then the two sets are determined to be statistically different at the tested confidence interval. This analysis can be done on a pair of data sets or can be used to compare two curves if several points on the two curves are compared.

Each panel set was also subjected to dynamic micro chamber testing ("DMC"). The DMC panel conditioning was conducted over seven days and the test was completed on the seventh day. The DMC tests confirmed that the panels of Ex. 3A-C all met CARB Phase II emission requirements.

Embodiments of the present disclosure further relate to any one or more of the following paragraphs:

1. A method for making an amino-aldehyde resin, comprising: mixing an intermediate amino-aldehyde reaction product having a total aldehyde compound to total amino compound molar ratio ranging from about 1.4:1 to about 3:1 with a first aldehyde compound and a first amino compound to produce an amino-aldehyde resin having a total aldehyde compound to total amino compound molar ratio ranging from about 0.5:1 to about 1.2:1, wherein the concentration of the first aldehyde compound in the amino-aldehyde resin is about 1.9 wt % or more based on a combined solids weight of the aldehyde compounds and the amino compounds in the amino-aldehyde resin.

2. A method for preparing a composite product, comprising: contacting a plurality of particulates with an amino-aldehyde resin, wherein the amino-aldehyde resin is produced by mixing an intermediate amino-aldehyde reaction product having a total aldehyde compound to total amino compound molar ratio ranging from about 1.4:1 to about 3:1 with a first amino compound and a first aldehyde compound, wherein the amino-aldehyde resin has a total aldehyde compound to total amino compound molar ratio ranging from about 0.5:1 to about 1.2:1, and wherein the concentration of the first aldehyde compound in the amino-aldehyde resin is about 1.9 wt % or more based on a combined solids weight of the aldehyde compounds and the amino compounds in the amino-aldehyde resin; and at least partially curing the amino-aldehyde resin to produce a composite product.

3. A composite product, comprising: a plurality of particulates and an at least partially cured amino-aldehyde resin, wherein the amino-aldehyde resin, prior to at least partial curing, is produced by mixing an intermediate amino-aldehyde reaction product having a total aldehyde compound to total amino compound molar ratio ranging from about 1.4:1 to about 3:1 with a first amino compound and a first aldehyde compound, wherein the amino-aldehyde resin has a total aldehyde compound to total amino compound molar ratio ranging from about 0.5:1 to about 1.2:1, and wherein the concentration of the first aldehyde compound in the amino-aldehyde resin is about 1.9 wt % or more based on a combined solids weight of the aldehyde compounds and the amino compounds in the amino-aldehyde resin.

4. The method or composite product according to any one of paragraphs 1 to 3, wherein the concentration of the first aldehyde compound in the amino-aldehyde resin is about 5 wt % or more based on the combined solids weight of the aldehyde compounds and the amino compounds in the amino-aldehyde resin.

5. The method or composite product according to any one of paragraphs 1 to 4, wherein the concentration of the first aldehyde compound in the amino-aldehyde resin is about 5 wt % to about 15 wt % based on the combined solids weight of the aldehyde compounds and the amino compounds in the amino-aldehyde resin.

6. The method or composite product according to any one of paragraphs 1 to 5, wherein the intermediate amino-aldehyde reaction product is mixed with the first aldehyde compound and the first amino compound under conditions at which a reaction rate of methylolation is greater than a reaction rate of condensation.

7. The method or composite product according to any one of paragraphs 1 to 6, wherein the intermediate amino-aldehyde reaction product is substantially free of any catalyst when mixed with the first aldehyde compound and the first amino compound.

8. The method or composite product according to any one of paragraphs 1 to 7, wherein the intermediate amino-aldehyde reaction product has a pH of about 6.5 or more prior to mixing the first aldehyde compound and the first amino compound with the intermediate amino-aldehyde reaction product.

9. The method or composite product according to any one of paragraphs 1 to 8, wherein the amino-aldehyde resin has a shelf life of at least 1 day.

10. The method or composite product according to any one of paragraphs 1 to 9, wherein the amino-aldehyde resin has an increase of about 1% or more in the C-13 NMR signals in the range of about 65.2 ppm to about 65.6 ppm as compared to an amino aldehyde resin produced by mixing the first amino compound with the intermediate amino-aldehyde reaction product, without the first aldehyde compound.

11. The method or composite product according to any one of paragraphs 1 to 10, wherein the intermediate amino-aldehyde reaction product is a urea-formaldehyde resin, a melamine-formaldehyde resin, a melamine-urea-formaldehyde resin, or any mixture thereof.

12. The method or composite product according to any one of paragraphs 1 to 11, wherein the first aldehyde compound comprises formaldehyde, a pre-reacted urea-formaldehyde mixture having a urea to formaldehyde weight ratio of about 1:2 to about 1:5, or a combination thereof, and wherein the first amino compound comprises urea, melamine, a pre-reacted urea-formaldehyde mixture having a urea to formaldehyde weight ratio of about 1:2 to about 1:5, or a combination thereof.

13. The method or composite product according to any one of paragraphs 1 to 12, wherein the intermediate amino-aldehyde reaction product comprises a urea-formaldehyde resin, the first aldehyde compound comprises formaldehyde, and the first amino compound comprises urea, and wherein the intermediate amino-aldehyde reaction product has a temperature of about 85° C. or less and a pH of about 6.5 or more when the first aldehyde compound and the first amino compound are mixed therewith.

14. The method or composite product according to any one of paragraphs 1 to 13, wherein the intermediate amino-aldehyde reaction product comprises a melamine-urea-formaldehyde resin, the first aldehyde compound comprises formaldehyde, and the first amino compound comprises urea, and wherein the intermediate amino-aldehyde reaction product has a temperature of about 85° C. or less and a pH of about 7.5 or more when the first aldehyde compound and the first amino compound are mixed therewith.

15. The method or composite product according to any one of paragraphs 1 to 14, further comprising: reacting a second aldehyde compound and a second amino compound under basic reaction conditions to produce a first intermediate, wherein a molar ratio of the second aldehyde compound to the second amino compound ranges from about 1.4:1 to about 3:1; and reacting the first intermediate under acidic reaction conditions to produce the intermediate amino-aldehyde reaction product.

16. The method or composite product according to paragraph 15, further comprising adding a third amino compound to the first intermediate during the reaction thereof to produce the intermediate amino-aldehyde reaction product.

17. The method or composite product according to paragraph 15, further comprising adding a third amino compound and a fourth amino compound to the first intermediate during the reaction thereof to produce the intermediate amino-aldehyde reaction product, wherein the third amino compound is the same as the first and second amino compounds, and wherein the fourth amino compound is different than the first, second, and third amino compounds.

18. The method or composite product according to any one of paragraphs 1 to 14, further comprising: reacting a second aldehyde compound and a second amino compound under acidic reaction conditions to produce a first intermediate, wherein a molar ratio of the second aldehyde compound to the second amino compound ranges from about 3:1 to about 5:1; adding a third amino compound to the first intermediate to produce a second intermediate having a molar ratio of total aldehyde compounds to total amino compounds of about 1.4:1 to about 3:1; and reacting the second intermediate under acidic reaction conditions to produce the intermediate amino-aldehyde reaction product.

19. The method or composite product according to paragraph 18, further comprising adding a fourth amino compound to the second intermediate during the reaction thereof to produce the intermediate amino-aldehyde reaction product.

20. The method or composite product according to paragraph 18, further comprising adding a fourth amino compound and a fifth amino compound to the second intermediate during the reaction thereof to produce the intermediate amino-aldehyde reaction product, wherein the fourth amino compound is the same as the first, second, and third amino compounds, and wherein the fifth amino compound is different from the first, second, third, and fourth amino compounds.

21. The method or composite product according to any one of paragraphs 1 to 20, wherein the amino-aldehyde resin has a molar ratio of total aldehyde compounds to total amino compounds of about 0.5:1 to about 1:1.

22. The method or composite product according to any one of paragraphs 1 to 21, further comprising adding a latent catalyst to the amino-aldehyde resin.

23. The method or composite product according to paragraph 22, wherein the latent catalyst comprises triethylamine sulfate, triethylamine phosphate, triethylamine chloride, trimethylamine sulfate, trimethylamine phosphate, trimethylamine chloride, tripropylamine sulfate, tripropylamine phosphate, tripropylamine chloride, sodium sulfate, sodium phosphate, sodium chloride, or any combination thereof.

24. The method according to any one of paragraphs 1 or 4 to 23, further comprising combining the amino-aldehyde resin with a plurality of particulates to form a curable mixture, and at least partially curing the curable mixture to produce a product.

25. The method according to any one of paragraphs 1 or 4 to 24, wherein the product is a particleboard, a fiberboard, a plywood, an oriented strand board, or a fiber mat.

26. The method according to any one of paragraphs 2 or 4 to 23, further comprising collecting the contacted particulates to form a non-woven mat prior to at least partially curing the amino-aldehyde resin, and pressing the non-woven mat prior to, during, or after at least partially curing the amino-aldehyde resin.

27. The method according to any one of paragraphs 2, 4 to 23, or 26, wherein the particulates comprise wood fibers, glass fibers, or a combination thereof.

28. The composite product according to any one of paragraphs 3 to 23, wherein the particulates comprise wood fibers, glass fibers, or a combination thereof.

29. The composite product according to any one of paragraphs 3 to 23 or 28, wherein the composite product is a particle board, a fiberboard, a plywood, an oriented strand board, or a non-woven fiberglass mat Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making an amino-aldehyde resin, comprising:
   mixing an intermediate amino-aldehyde reaction product having a total aldehyde compound to total amino compound molar ratio ranging from about 1.4:1 to about 3:1 with a first aldehyde compound and a first amino compound to produce an amino-aldehyde resin having a total aldehyde compound to total amino compound molar ratio ranging from about 0.5:1 to 1:1, wherein:
   the intermediate amino-aldehyde reaction product comprises a urea-formaldehyde resin,
   the first aldehyde compound comprises formaldehyde,
   the first amino compound comprises urea,
   the concentration of the first aldehyde compound in the amino-aldehyde resin is about 1.9 wt % or more based on a combined solids weight of the aldehyde compounds and the amino compounds in the amino-aldehyde resin,
   the concentration of the first aldehyde compound in the amino-aldehyde resin is at least 21 wt % to about 40 wt %, based on the solids weight of the aldehyde compounds in the amino-aldehyde resin, and
   the intermediate amino-aldehyde reaction product is at a temperature of about 85° C. or less and a pH of about 7.5 or more when the first aldehyde compound and the first amino compound are mixed therewith.

2. The method of claim 1, wherein the intermediate amino-aldehyde reaction product has a total aldehyde compound to total amino compound molar ratio ranging from about 1.4:1 to about 1.9:1 when mixed with the first aldehyde compound and the first amino compound to produce the amino-aldehyde resin.

3. The method of claim 1, wherein the concentration of the first aldehyde compound in the amino-aldehyde resin is about 5 wt % to about 15 wt % based on the combined solids weight of the aldehyde compounds and the amino compounds in the amino-aldehyde resin.

4. The method of claim 1, wherein the intermediate amino-aldehyde reaction product is mixed with the first aldehyde compound and the first amino compound under conditions at which a reaction rate of methylolation is greater than a reaction rate of condensation.

5. The method of claim 1, wherein the intermediate amino-aldehyde reaction product is substantially free of any catalyst when mixed with the first aldehyde compound and the first amino compound.

6. The method of claim 1, wherein the wherein the intermediate amino-aldehyde reaction product has a total aldehyde compound to total amino compound molar ratio ranging from about 1.4:1 to about 1.8:1 when mixed with the first aldehyde compound and the first amino compound to produce the amino-aldehyde resin.

7. The method of claim 1, further comprising:
reacting a second aldehyde compound and a second amino compound under basic reaction conditions to produce a first intermediate, wherein a molar ratio of the second aldehyde compound to the second amino compound ranges from about 1.4:1 to about 3:1; and
reacting the first intermediate under acidic reaction conditions to produce the intermediate amino-aldehyde reaction product.

8. The method of claim 1, further comprising:
reacting a second aldehyde compound and a second amino compound under acidic reaction conditions to produce a first intermediate, wherein a molar ratio of the second aldehyde compound to the second amino compound ranges from about 3:1 to about 5:1;
adding a third amino compound to the first intermediate to produce a second intermediate having a molar ratio of total aldehyde compounds to total amino compounds of about 1.4:1 to about 3:1; and
reacting the second intermediate under acidic reaction conditions to produce the intermediate amino-aldehyde reaction product.

9. The method of claim 8, further comprising adding a fourth amino compound to the second intermediate during the reaction thereof to produce the intermediate amino-aldehyde reaction product.

10. The method of claim 1, wherein the amino-aldehyde resin has a molar ratio of total aldehyde compounds to total amino compounds of about 0.5:1 to less than 1:1.

11. The method of claim 1, further comprising adding a latent catalyst to the amino-aldehyde resin.

12. The method of claim 11, wherein the latent catalyst comprises triethylamine sulfate, triethylamine phosphate, triethylamine chloride, trimethylamine sulfate, trimethylamine phosphate, trimethylamine chloride, tripropylamine sulfate, tripropylamine phosphate, tripropylamine chloride, or any combination thereof.

13. The method of claim 1, further comprising combining the amino-aldehyde resin with a plurality of particulates to form a curable mixture, and at least partially curing the curable mixture to produce a product, wherein the product is a particleboard, a fiberboard, a plywood, an oriented strand board, or a fiber mat.

14. The method of claim 1, wherein the intermediate amino-aldehyde reaction product has a total aldehyde compound to total amino compound molar ratio of about 1.4:1 to about 1.9:1 and is at a pH of 7.5 or more and a temperature of 60° C. or less when the first aldehyde compound and the first amino compound are mixed therewith, and wherein the amino-aldehyde resin has a molar ratio of total aldehyde compounds to total amino compounds of about 0.5:1 to less than 1:1.

15. A composite product, comprising:
a plurality of particulates and an at least partially cured amino-aldehyde resin, wherein the amino-aldehyde resin, prior to at least partial curing, is produced by mixing an intermediate amino-aldehyde reaction product having a total aldehyde compound to total amino compound molar ratio ranging from about 1.4:1 to about 3:1 with a first amino compound and a first aldehyde compound, wherein:
the amino-aldehyde resin has a total aldehyde compound to total amino compound molar ratio ranging from about 0.5:1 to 1:1,
the intermediate amino-aldehyde reaction product comprises a urea-formaldehyde resin,
the first aldehyde compound comprises formaldehyde,
the first amino compound comprises urea,
the concentration of the first aldehyde compound in the amino-aldehyde resin is about 1.9 wt % or more based on a combined solids weight of the aldehyde compounds and the amino compounds in the amino-aldehyde resin,
the concentration of the first aldehyde compound in the amino-aldehyde resin is at least 21 wt % to about 40 wt %, based on the solids weight of the aldehyde compounds in the amino-aldehyde resin, and
the intermediate amino-aldehyde reaction product is at a temperature of about 85° C. or less and a pH of about 7.5 or more when the first aldehyde compound and the first amino compound are mixed therewith.

16. The composite product of claim 15, wherein the particulates comprise wood fibers, glass fibers, or a combination thereof, wherein the amino-aldehyde resin, prior to at least partially curing, further comprises a latent catalyst comprising triethylamine sulfate, triethylamine phosphate, triethylamine chloride, trimethylamine sulfate, trimethylamine phosphate, trimethylamine chloride, tripropylamine sulfate, tripropylamine phosphate, tripropylamine chloride, or any combination thereof, and wherein the amino-aldehyde resin has a total aldehyde compound to total amino compound molar ratio ranging from about 0.5:1 to less than 1:1.

17. The composite product of claim 15, wherein the composite product is a particle board, a fiberboard, a plywood, an oriented strand board, or a non-woven fiberglass mat, wherein the amino-aldehyde resin, prior to at least partially curing, further comprises a latent catalyst comprising triethylamine sulfate, triethylamine phosphate, triethylamine chloride, trimethylamine sulfate, trimethylamine phosphate, trimethylamine chloride, tripropylamine sulfate, tripropylamine phosphate, tripropylamine chloride, or any combination thereof, and wherein the amino-aldehyde resin has a total aldehyde compound to total amino compound molar ratio ranging from about 0.5:1 to less than 1:1.

18. A method for preparing a composite product, comprising:
contacting a plurality of particulates with an amino-aldehyde resin, wherein the amino-aldehyde resin is produced by mixing an intermediate amino-aldehyde reaction product having a total aldehyde compound to total amino compound molar ratio ranging from about 1.4:1 to about 3:1 with a first amino compound and a first aldehyde compound, wherein:

the amino-aldehyde resin has a total aldehyde compound to total amino compound molar ratio ranging from about 0.5:1 to 1:1, the intermediate amino-aldehyde reaction product comprises a urea-formaldehyde resin the first aldehyde compound comprises formaldehyde, the first amino compound comprises urea, the concentration of the first aldehyde compound in the amino-aldehyde resin is about 1.9 wt % or more based on a combined solids weight of the aldehyde compounds and the amino compounds in the amino-aldehyde resin, the concentration of the first aldehyde compound in the amino-aldehyde resin is at least 21 wt % to about 40 wt %, based on the solids weight of the aldehyde compounds in the amino-aldehyde resin, and the intermediate amino-aldehyde reaction product is at a temperature of about 85° C. or less and a pH of about 7.5 or more when the first aldehyde compound and the first amino compound are mixed therewith; and at least partially curing the amino-aldehyde resin to produce a composite product.

19. The method of claim 18, further comprising collecting the contacted particulates to form a non-woven mat prior to at least partially curing the amino-aldehyde resin, and pressing the non-woven mat prior to, during, or after at least partially curing the amino-aldehyde resin.

20. The method of claim 18, wherein the particulates comprise wood fibers, glass fibers, or a combination thereof, wherein the amino-aldehyde resin further comprises a latent catalyst comprising triethylamine sulfate, triethylamine phosphate, triethylamine chloride, trimethylamine sulfate, trimethylamine phosphate, trimethylamine chloride, tripropylamine sulfate, tripropylamine phosphate, tripropylamine chloride, or any combination thereof, and wherein the amino-aldehyde resin has a total aldehyde compound to total amino compound molar ratio ranging from about 0.5:1 to less than 1:1.

* * * * *